(12) United States Patent
Boire et al.

(10) Patent No.: US 12,544,486 B2
(45) Date of Patent: Feb. 10, 2026

(54) ADDITIVE MANUFACTURING OF VINYL, PHOTOCROSSLINKABLE POLYMERS

(71) Applicant: VenoStent, Inc., Houston, TX (US)

(72) Inventors: Timothy C. Boire, Houston, TX (US); Jordan S. Miller, Houston, TX (US); Bagrat Grigoryan, Houston, TX (US); Candice Sears, Houston, TX (US)

(*) Notice: Subject to any disclaimer, the term of this patent is extended or adjusted under 35 U.S.C. 154(b) by 810 days.

(21) Appl. No.: 17/629,621

(22) PCT Filed: Jul. 23, 2020

(86) PCT No.: PCT/US2020/043159
§ 371 (c)(1),
(2) Date: Jan. 24, 2022

(87) PCT Pub. No.: WO2021/016406
PCT Pub. Date: Jan. 28, 2021

(65) Prior Publication Data
US 2022/0257827 A1  Aug. 18, 2022

Related U.S. Application Data

(60) Provisional application No. 62/877,066, filed on Jul. 22, 2019.

(51) Int. Cl.
| | |
|---|---|
| A61L 27/18 | (2006.01) |
| A61L 27/58 | (2006.01) |
| B29C 64/129 | (2017.01) |
| B33Y 10/00 | (2015.01) |
| B33Y 70/00 | (2020.01) |
| B33Y 80/00 | (2015.01) |
| C08G 63/08 | (2006.01) |
| C08J 3/24 | (2006.01) |
| C08K 5/00 | (2006.01) |
| C08K 5/09 | (2006.01) |

(52) U.S. Cl.
CPC .............. *A61L 27/18* (2013.01); *A61L 27/58* (2013.01); *B29C 64/129* (2017.08); *C08G 63/08* (2013.01); *C08J 3/24* (2013.01); *C08K 5/0025* (2013.01); *C08K 5/09* (2013.01); *B33Y 10/00* (2014.12); *B33Y 70/00* (2014.12); *B33Y 80/00* (2014.12); *C08G 2230/00* (2013.01); *C08G 2280/00* (2013.01)

(58) Field of Classification Search
CPC ...................................................... A61L 31/06
See application file for complete search history.

(56) References Cited

U.S. PATENT DOCUMENTS

| | | |
|---|---|---|
| 2012/0177592 A1 | 7/2012 | Radosz |
| 2018/0126046 A1 | 5/2018 | Sung et al. |
| 2019/0091377 A1 | 3/2019 | Bettinger et al. |

FOREIGN PATENT DOCUMENTS

WO  WO-2019013101 A1 *  1/2019 ............. A61F 2/844

OTHER PUBLICATIONS

Boire, T.C. et al., Development of a shape memory patch for minimally invasive vascular rupture, Society for Biomaterials, Abstract #922, 2013 (Year: 2013).*
Boire, T.C. et al., Pendant allyl crosslinking as a tunable shape memory actuator for vascular applications, 2015, Acta Biomaterialia, vol. 24, 53-63 (Year: 2015).*
Ma, S. et al., Degradable thermosets based on labile bonds or linkages: A review, 2018, Progress in Polymer Science, vol. 76, 65-110 (Year: 2018).*
Ortiz, R.A. et al., Preparation of a crosslinked sucrose polymer by thiol-ene photopolymerization using dithiothreitol as a comonomer, 2010, Carbohydrate Polymers, vol. 82, 822-828 (Year: 2010).*
Amsden, et al., "In Vivo Degradation Behavior of Photo-Cross-Linked star-Poly Elastomers", Biomacromolecules 2006, 7, pp. 365-372.
Biore, et al., "Development of a shape memory patch for minimally invasive vascular rupture", Society for Biomaterials, Abstract #922, 2013.

(Continued)

*Primary Examiner* — Bethany P Barham
*Assistant Examiner* — Paul Hoerner
(74) *Attorney, Agent, or Firm* — Patterson Intellectual Property Law, P.C.; Mark A. Kilgore

(57) ABSTRACT

Various precursor solutions and methods of 3D printing and other additive manufacturing approaches are provided for the manufacture of articles using photocrosslinkable vinyl shape memory polymers. In various aspects, articles are manufactured by a process comprising (i) exposing a precursor solution to an intensity and frequency of light to initiate photo-polymerization of the precursor solution to form a layer of the article; and (ii) repeating step (i) a number of times to form the article in a layer-by-layer approach; wherein the precursor solution comprises a first polymeric precursor comprising a plurality of vinyl terminated side-chains attached thereto. A vinyl-functionalized, photocrosslinkable SMP used as an example herein is a novel variant of a previously disclosed SMP composition, with higher amounts of vinyl functionalization but similar thermomechanical properties to the SMP library previously disclosed. Moreover, a unique combination of chemistries is disclosed that incorporates the aforementioned vinyl-functionalized SMPs along with acrylate-based crosslinkers. Additional novel compositions are disclosed containing the vinyl-functionalized SMPs with additional dithiol functionalizations, vinyl-functionalized SMPs with dithiol crosslinkers, as well as vinyl-functionalized SMPs with both acrylate-based and dithiol crosslinkers, as another means to tune degradation rates and other material properties. The articles can include a variety of articles such as stents, grafts, external sheaths, and the like. Beneficially, the printed articles can include a plurality of pores having an average diameter of about 50 pm to about 5000 pm, about 500 pm to about 2000 pm, or about 1000 pm even in the absence of a photoblocker.

17 Claims, 18 Drawing Sheets

(56) References Cited

OTHER PUBLICATIONS

Kuang, et al., "3D Printing of Highly Stretchable, Shape-Memory, and Self-Healing Elastomer toward Novel 4D Printing", ACS Appl. Mater. Interfaces 2018, 10, pp. 7381-7388.
International Search Report & Written Opinion for International Patent Application No. PCT/US20/043159.

* cited by examiner

Both initiators soluble in DMSO at 2 wt%.

Diphenyl(2,4,6-trimethylbenzoyl)phosphine oxide
(DTPO)
Sigma 415952

2,2-Dimethoxy-2-phenylacetophenone
(DMPA)
Sigma 196118

DTPO is effective at 405 nm.

FIG. 15

ADDITIVE MANUFACTURING OF VINYL, PHOTOCROSSLINKABLE POLYMERS

CROSS-REFERENCES TO RELATED APPLICATIONS

This application claims benefit of the following patent application(s) which is/are hereby incorporated by reference: U.S. Provisional Patent Application Ser. No. 62/877,066 filed on Jul. 22, 2019.

STATEMENT REGARDING FEDERALLY SPONSORED RESEARCH OR DEVELOPMENT

At least a portion of the following disclosure was funded in part by NSF STTR Phase I Award #1819996 and NIH STTR Phase I Award #1-R41-HL151025-01.

TECHNICAL FIELD

The present disclosure generally relates to additive manufacturing, and in particular to additive manufacturing of vinyl-functionalized polymers and/or shape memory polymers (SMPs) for biomedical applications. A vinyl-functionalized, photocrosslinkable SMP used as an example herein is a novel variant of a previously disclosed SMP composition, with higher amounts of vinyl functionalization but similar thermomechanical properties to the SMP library previously disclosed. Moreover, a unique combination of chemistries is disclosed that incorporates the aforementioned vinyl-functionalized SMPs along with acrylate-based crosslinkers. Additional novel compositions are disclosed containing the vinyl-functionalized SMPs with additional dithiol functionalizations, vinyl-functionalized SMPs with dithiol crosslinkers, as well as vinyl-functionalized SMPs with dithiol and acrylate crosslinkers, as another means to tune degradation rates and other material properties.

BACKGROUND

Photocrosslinkable materials can be used for manufacturing of biomedical or industrial devices through a variety of methods. Some of these methods include dip casting, injection molding, additive manufacturing, or some combination thereof. Dip casting offers the advantage of speed, but has the disadvantage of poorly generating consistent thicknesses due to gravitational effects. Moreover, dip casting suffers to generate intricate details such as pores and may require additional manufacturing processes to achieve any intricate detailing. To achieve these details, one may use processes such as salt leaching or laser ablation, however each of these has its own disadvantages as well. Salt leaching is imprecise and is difficult to produce the desired result accurately and consistently. Laser ablation presents challenges for three-dimensional objects, it is expensive, and further it may leave behind toxic residuals that are difficult to remove from the product. Injection molding is a popular method of manufacture, but challenges are presented for photocured materials that require translucent, non-photoabsorbing molds that can be readily removed from the photocured device following the photocuring step, especially as the device possess smaller, more intricate features like pores.

Additive manufacturing processes offer the potential to produce intricate geometries for medical and industrial applications in tailorable, reliable, and scalable ways. Stereolithography (SLA), digital light processing (DLP), or projection SLA, in which light is used to crosslink monomers and polymers, offers advantages to other modes of 3D printing in that it is relatively fast and is capable of producing almost any shape. However, SLA and DLP are often only reserved for acrylate-based monomers and polymers, which limits the ability to produce products from materials that offer distinct advantages and better address biomedical or industrial application requirements. For example, vinyl-functionalized, photocrosslinkable materials with unique thermal, mechanical, and degradation properties and superior biocompatibility may require an evolving of SLA techniques in order to reliably manufacture and commercialize medical devices out of them because they may not photocrosslink as efficiently as acrylate groups. Moreover, polymers that do not require the addition of photoabsorbers/photoblockers, which are typically necessary to prevent crosslinking between void spaces such as pores, are desirable as this can reduce biocompatibility risks and dramatically simplify formulation preparation (otherwise, absorption at 405 nm or other crosslinking wavelength needs to be normalized).

Smart materials such as shape memory polymers (SMPs) are another example. SMPs are particularly interesting for 3D printing because they can be implemented into minimally invasive delivery systems such as catheters or laparoscopes and recover their originally-designed shape. If one were able to reliably 3D print products out of SMP materials desirable for a particular biomedical application, it is possible that the device design could be matched to patient physiology through 3D printing of the "negative" of clinically-acquired images (e.g. X-rays, MRIs, etc.) directly in a doctor's office, and even potentially implant in a minimally-invasive manner. Thermo-responsive SMPs are able to do this by heating above an SMP's melting transition temperature or glass transition temperature. Thermo-responsive SMPs with melting temperatures below body temperature, such as poly($\varepsilon$-caprolactone-co-$\alpha$ allyl-$\varepsilon$-caprolactone) (PCL-ACPCL), possess semi-adhesive properties that enable form-fitting over complex geometries (i.e. custom fittability), which can be important in providing more surface area coverage to lesions to provide structural and therapeutic benefits. Drugs, peptides, and other therapeutic agents can be loaded within the copolymer matrix for controlled delivery of the therapeutic. The self-healing properties can also find use in industrial applications (e.g. as sealants, coatings, fillings, paint additives), while its unique mechanical and shape memory features could find use in fittings or coils.

However, 3D printing of soft materials such as these presents unique challenges. For example, there can be issues with maintaining solubility of hydrophobic polymers and an appropriate photoinitiator in relatively safe organic solvents that are appropriate for commercializable manufacturing processes. Moreover, owing to the unique photocrosslinking characteristics of vinyl-functionalized polymers (e.g. allyl- or allyl carboxylate-functionalized), layers of the print can delaminate, resulting in the mechanical integrity of the print being compromised or completely destroyed. Materials that are too soft also cannot adequately support designs of sufficient height and complexity for various applications. Support resins that can be difficult to remove, can impact resolution, and add additional complexity to the process are also not ideal and should be avoided if possible. It is essential to overcome these roadblocks in order to develop products that are customizable and can more sufficiently address the needs of specific biomedical or industrial applications.

It is also important to be able to control the degradation rates of polymers to optimize device performance for a particular biomedical application and also to minimize infection risks and other possible complications from long-term implantation. Moreover, mechanical properties should be tuned to match the needs of the particular application. For example, mechanical properties of implantable devices should ideally closely match that of the native tissue environment into which they are implanted. If a graft is much stiffer than the artery with which they are tied to, for instance, the high stresses experienced around the anastomosis from the compliance mismatch can lead to luminal cellular migration and proliferation that results in a blockage of blood flow through the vessel. PCL-based materials are mechanically compliant, but their slow biodegradation timelines may not be ideal for certain applications where an implant only needs to function for a few months. It is often difficult to control these properties independently of one another, and in a convenient, facile manner.

There remains a need for improved vinyl-functionalized polymers and/or shape memory polymers that can be 3D printed into complex and useful geometries and overcome the aforementioned deficiencies.

SUMMARY

In various embodiments, articles are provided that may be prepared by 3D printing or additive manufacturing using a vinyl-functionalized and/or shape memory polymer that may overcome one or more of the aforementioned deficiencies. In some embodiments, an article is manufactured by a process comprising: (i) exposing a precursor solution to an intensity and frequency of light to initiate photo-polymerization of the precursor solution to form a layer of the article; and (ii) repeating step (i) a determined number of times to form the article in a layer-by-layer approach; wherein the precursor solution may include a first polymeric precursor having a plurality of vinyl terminated side-chains attached thereto. In some embodiments, the precursor solution may further include an acrylate crosslinker, such as one containing alkylene oxide. In some examples, the first polymeric precursor may be or may include a copolymer containing a first type of repeat unit having the vinyl terminated side-chains and a second type of repeat unit without the vinyl terminated sidechains. The precursor solution can further include other additives, photointiators, and the like. In some embodiments, the precursor solution may be substantially free of photoblocker. In various embodiments, the precursor solutions are also provided that can be used for the 3D printing or other additive manufacture of various articles with shape memory polymers.

A variety of articles are disclosed herein which may be capable of manufacture by the processes as described and may use the precursor solutions described herein. In various embodiments, the articles may include a stent, graft, mesh, wrap, external sheath, aneurysmal filler or diverter, catheter guide or component thereof, laparoscope guide or component thereof, drug delivery vehicle, device coating, connector, fitting, or any application utilizing additive manufacturing with this type of precursor formulation. In some embodiments, the articles may be manufactured to have a plurality of pores, which can be beneficial in a number of medical applications. In some embodiments, the article may include a plurality of pores having an average final diameter of about 50 μm to about 5000 μm, about 500 μm to about 2000 μm, or about 1000 μm.

Other systems, methods, features, and advantages of the precursor solutions and methods for additive manufacturing with shape memory polymers and articles made therefrom may include biodegradable, vinyl-functionalized shape memory polymers with independently-tunable thermal, mechanical, and degradation properties that can be 3D printed into complex and useful geometries. Such systems, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 15 includes photomicrographs of 10 mm porous cylinder prints from various SMP formulations.

DETAILED DESCRIPTION

Figure 1:
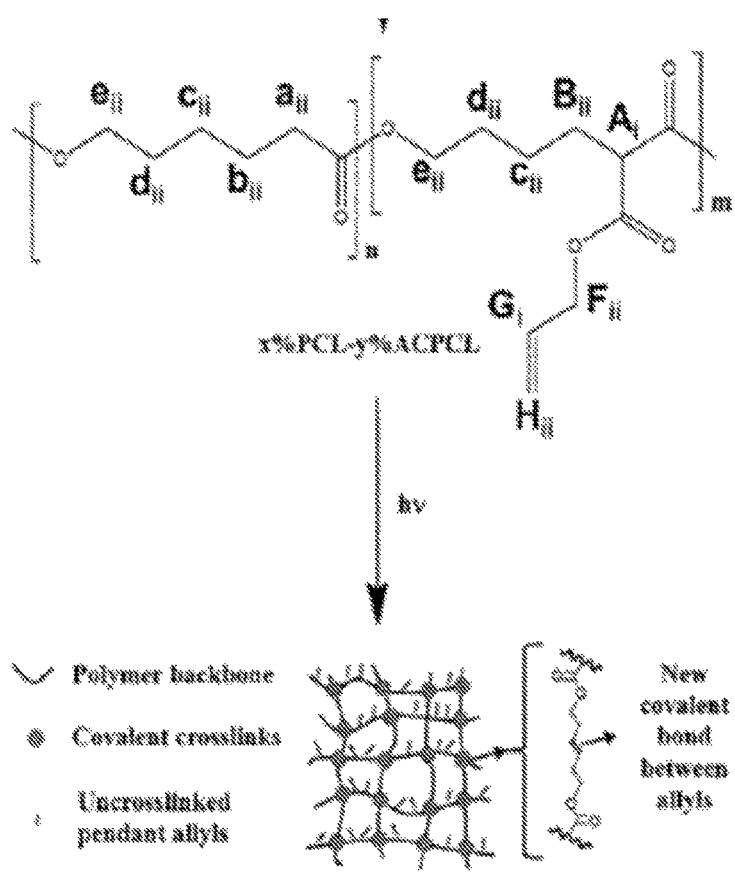
FIG. 1. is a diagram depicting poly(ε-caprolactone-co-α-allyl-ε-caprolactone) (PCL-ACPCL) chemical structure, and photocrosslinking.

Exemplary applications of apparatuses and methods according to the present disclosure are described in this section. These examples are being provided solely to add context and aid in the understanding of this disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the invention, it is understood that these examples are not limiting; such that other embodiments may be used, and changes may be made without departing from the spirit and scope of the disclosure.

In various embodiments, precursor solutions, methods of 3D printing and other additive manufacturing using the precursor solutions, and articles of manufacture produced therefrom are provided. The precursor solution may include a first polymeric precursor comprising a plurality of vinyl terminated sidechains attached thereto. It will be understood by one of skill in the art that the polymeric precursor solutions may be used to manufacture a variety of articles using shape memory polymers and without the need for added photoblocker(s).

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, various methods and materials may now be described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Definitions

Unless defined otherwise, all technical and scientific terms used herein have the same meaning as commonly understood by one of ordinary skill in the art. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, the term "photoblocker" refers to small molecule additives with strong absorbance in the frequency of light used for the additive manufacturing. For example, when blue laser or light sources are described herein, a suitable photoblocker would have strong absorbance around 405 nm, e.g. about 395 nm to 420 nm. It should be noted that, when referring to a precursor solution, while the precursor polymer may have some photoblocking characteristics itself, it is not defined or included as the "photoblocker". Instead, the term "photoblocker" refers to additives that may be included or may be present in addition to the precursor polymer to control the penetration depth of the light source.

Methods of Additive Manufacturing of Vinyl-Functionalized Polymers

Embodiments of a process for, the polymerization product of, and articles manufactured by additive manufacturing of vinyl-functionalized polymers and/or shape memory polymers are described herein.

As disclosed herein, articles may be manufactured by a process comprising: (i) providing a manufacturing device; (ii) providing a precursor polymer; (iii) exposing the precursor polymer to an intensity and frequency of light to initiate photo-polymerization of the precursor polymer to form a layer of the article; and (iv) repeating step (iii) a number of times to form the article in a layer-by-layer configuration. In some embodiments, the precursor polymer may be provided in a precursor solution. In yet further embodiments, it may be necessary to sterilize the article in which at least one cycle of ethylene oxide sterilization may be conducted. In some embodiments, two or more cycles of ethylene oxide sterilization may be conducted.

To effectively manufacture the articles by the process as described herein, some embodiments of the manufacturing process may further include heating at least a portion of the manufacturing device. The heating may allow for the constituents of the precursor solution to remain in solution and at proper thermal and/or mechanical ranges to allow for formation in a layer configuration. It may be required to pre-heat at least a portion of the manufacturing device before providing the precursor polymer and/or precursor solution. In some embodiments, the manufacturing device may include a platform which may house the precursor solution. The precursor solution may be disposed in a container, such as a glass dish, which may be disposed about the platform. In some embodiments, the platform may be configured to be heated, thereby heating the precursor solution. The manufacturing device and/or platform may be heated to about 20° C. to 80° C., or about 30° C. to 50° C., or about 40° C. to 45° C. In some embodiments, the manufacturing device and/or platform may be heated to 75° C. It will be understood that the precursor solution may be at a lower temperature than the temperature of the device or platform.

Figure 10:
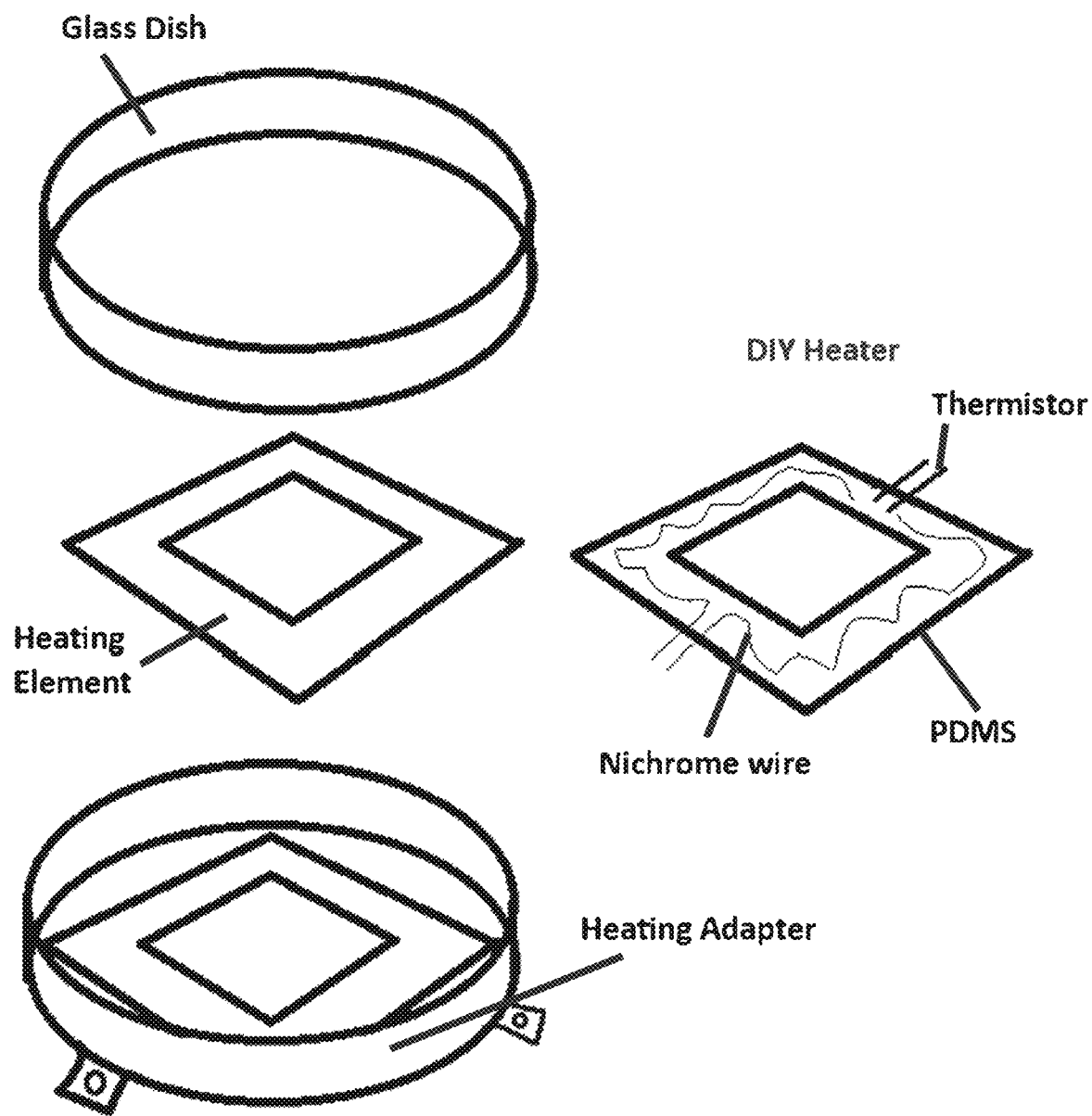
FIG. 10 is a schematic of the sample heating element for 3D printing of poly(ε-caprolactone-co-α allyl-ε-caprolactone) (PCL-ACPCL).
Figure 11:
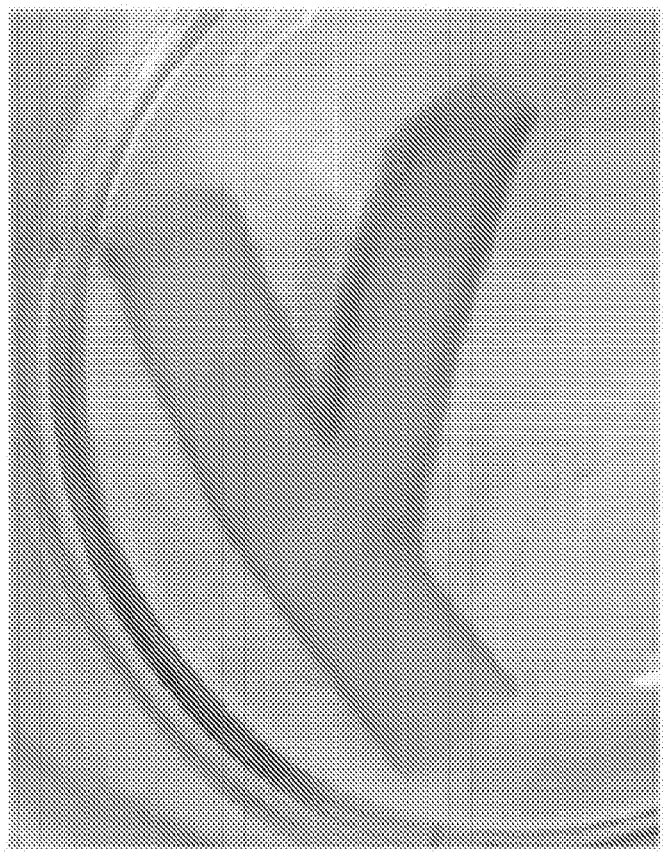
FIG. 11 includes photographs of taller, more complex designs printed from a poly(ε-caprolactone-co-α allyl-ε-caprolactone) (PCL-ACPCL) solution with poly(ethylene glycol) diacrylate (PEGDA).

In certain embodiments, the manufacturing device may include a heating element disposed between the platform and the solution container wherein the heating element is heated thereby heating the precursor solution. As depicted in FIGS. 10 and 11, the heating element may include a void configured to allow a light source to transfer light from the light source and onto the precursor polymer to initiate photo-polymerization.

In some embodiments, the manufacturing device may be a 3D printing device. The 3D printing device may include a movable z-platform that moves based on the desired printing of the final product. In some embodiments, the z-platform may be heated, or as shown in FIGS. 10 and 11, a heating element may be disposed about the z-platform between the platform and the solution container.

As previously disclosed, the process may include exposing the precursor polymer and/or the precursor solution to an intensity and frequency of light to initiate photo-polymerization of the precursor polymer to form a layer of the article. In some embodiments, the article is manufactured layer by layer, wherein each layer is produced at from 10 μm to 100 μm, more preferably from 25 μm to 75 μm, more preferably from 40 μm to 60 μm, and most preferably about 50 μm. In certain embodiments, the article may be exposed to light to initiate the photo-polymerization, wherein the exposure time is from 1 second to 60 seconds. In some embodiments, from 10 seconds to 50 seconds. In some embodiments, about 20 seconds to 30 seconds. In some embodiments, the exposure time is 6.5 seconds. In some embodiments, the exposure time is 20 seconds. And yet in further embodiments, one layer may have a different exposure time than another later. For example, a first layer may be exposed for 10 seconds wherein a second layer may be exposed for 20 seconds. In some embodiments, the first three layers may be exposed for 20 seconds while the remaining layers may be exposed for 6.5 seconds.

It may be necessary to undergo post-manufacture processing of the articles. In some embodiments, solvent may be warmed from about 40° C. to about 60° C. The article may be transferred to the warmed solvent and incubated at between about 40° C. to about 60° C. In some embodiments, the incubation may last for at least 6 hours. In some embodiments, the incubation may last at least 8 hours. In some embodiments, the article may be incubated in the solvent overnight. During the time the article remains in the solvent, unreacted solution may leach from the article. In some embodiments, the solvent may be selected from Table 4. In some embodiments, the solvent may be DMSO.

After incubation in the solvent, such as DMSO, the article may be transferred to an ethanol bath at room temperature. In some embodiments, the article may be washed in the ethanol bath from 15 minutes to 60 minutes, more preferably about 30 minutes. In some embodiments, the article may remain in the ethanol bath overnight. In some embodiments, the article may remain in an ethanol bath on the order or days, months, and/or years.

The manufacturing process may include providing a precursor polymer and/or a precursor solution. Generally, as used herein, the precursor polymer may be disposed in the precursor solution. In some embodiments, the precursor solution may include the precursor polymer, solvent, and a photoinitiator. In some embodiments, the precursor solution may further include a crosslinker.

In one embodiment, the precursor solution may include a first precursor polymer having a plurality of vinyl terminated sidechains attached thereto. The first precursor polymer may comprise a copolymer having a first type of repeat unit comprising the vinyl terminated sidechains and a second type of repeat unit without the vinyl terminated sidechains. In some embodiments, one or both of the first type of repeat unit and the second type of repeat unit may include polyester repeat units. In some embodiments, one or both of the first type of repeat unit and the second type of repeat unit may include repeat units prepared by ring opening polymerization or functionalization of a caprolactone.

In one embodiment, the precursor solution may include a first precursor polymer having a first repeat unit and a second repeat unit wherein the polymer may have a structure according to the following formula:

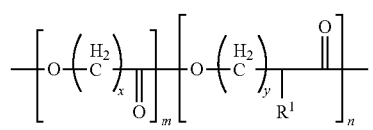

wherein m and n may be integers from about 5-400, wherein the m:n ratio may be from about 1:1 to 20:1, x and y are each independently an integer from 1 to 10; and wherein R1 is a vinyl terminated side-chain. In some embodiments, R1 may have a structure according to the following formula:

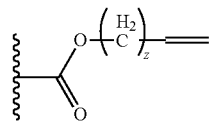

where z is an integer from 1 to 10, more preferably from 1 to 5, most preferably 1 to 2.

In certain embodiments, the precursor solution may include a first precursor polymer having a first repeat unit and a second repeat unit wherein the polymer may have a structure according to the following formula:

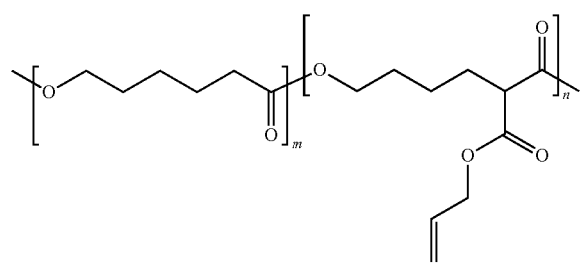

wherein m and n may be integers from about 5-400, wherein the m:n ratio may be from about 1:1 to 20:1. It will be understood that this structure comprises PCL-ACPCL. In some embodiments, PCL-ACPCL may be functionalized with vinyl-terminated sidechains as depicted above. The functionalization may be from 5% to 50% b/w of PCL-ACPCL. It may be desirable to have higher functionalizations which are useful for the disclosed manufacturing processes ranging from 35% to 50% b/w, and more preferably 40% to 45% b/w.

In some embodiments, the precursor solution may include an acrylate crosslinker. Generally, the acrylate crosslinker may be selected from mono-, di-, tri-, or more acrylate molecules. Additionally, acrylates with functional groups, peptides, nucleic acids, small molecules, monomers, or polymers attached to the molecule, and acrylates that are synthetic or natural may be selected. In some embodiments, the crosslinker may be reacted during the manufacturing process via the photopolymerization and create crosslinks between the polymers. In some embodiments, the precursor solution may include an acrylate crosslinker with alkylene oxide having a structure according to the following formula:

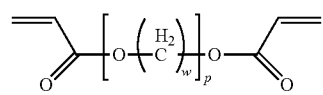

wherein w is an integer ranging from about 2-4 and p is an integer from about 1-20, more preferably from about 1-10, more preferably from about 2-10, and most preferably from about 2-5.

In some embodiments, the precursor solution can further include an alkylene oxide crosslinker having polyethylene glycol with acrylate end caps (PEGDA). The alkylene oxide crosslinker of PEGDA may have a structure according to the following formula:

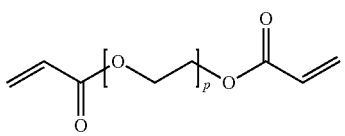

wherein p is an integer from about 1-150, more preferably from about 1-10, more preferably from about 2-10, and most preferably from about 2-5.

As provided previously, in some embodiments the precursor solution may be prepared with an appropriate solvent. When a solvent is utilized, the solvent may be required to meet certain minimum safety standards. To meet such minimum safety standards, the solvent may meet the same safety requirements as chloroform or may be of greater safety requirements than chloroform. In some embodiments, the solvent may be non-reactive with 3D printing components.

Additionally, the solvent may also have the ability to solubilize vinyl-functionalized polymers such as PCL-ACPCL. Solvents may include, but are not limited to methyl salicylate, acetophenone, DMSO, anisole, ethyl acetate, acetone, chloroform, benzyl alcohol, aniline, benzaldehyde, 2,2,2-trifluoroethanol, N—N-dimethylformamide, a-xylene, pyridine, toluene, tetrahydrofuran, 1,4-dioxane, and salts thereof. Table 1 provides an analysis of potential solvents which includes various characteristics of each solvent based on 1) NFPA Health Rating (low to high), 2) Safety Sum (low to high) of NFPA Ratings, 3) FDA Classification (high to low), 4) Boiling Point (high to low), and 5) Solubility Rating derived from a PCL solubility test at 25° C. (the solubility test method may be found at Terada M, Marchessault R H. Determination of solubility parameters for poly(3-hydroxyalkanoates). *International Journal of Biological Macromolecules*. 1999; 25:207-215).

TABLE 1

Ranking of solvents for manufacture of PCL-based SMPs. Ranking by 1) Health Rating (low to high), 2) Safety Sum (low to high), 3) FDA Class (high to low), 4) Boiling Point (high to low), and 5) Solubility Rating.

| Organic Solvent | PCL Solubility Rating[1] | FDA Class[2] | Acceptable ppm[3] | Health[4] | Flammability[4] | Reactivity[4] | Safety Sum[5] | PPE[6] | Boiling Point (C.) | Comment |
|---|---|---|---|---|---|---|---|---|---|---|
| Methyl salicylate | 2.5[a] | N/A | N/A | 1 | 1 | 0 | 2 | H | 223 | No FDA standards. Expensive |
| Acetophenone | 2.5[a] | N/A | N/A | 1 | 2 | 0 | 3 | J | 202 | No FDA standards. Expensive |
| DMSO | 0[b] | 3 | 5000 | 1 | 2 | 0 | 3 | F | 189 | Requires only dish, not vapor, respirator |
| Anisole | 3.5[c] | 3 | 5000 | 1 | 2 | 0 | 3 | H | 156 | Fairly expensive |
| Ethyl acetate | 1[d] | 3 | 5000 | 1 | 3 | 0 | 4 | H | 77.1 | Fairly volatile, Highly flammable |
| Acetone | 3[e] | 3 | 5000 | 1 | 3 | 0 | 4 | H | 56.5 | Volative. Highly flammable |
| Chloroform | 4[f] | 2 | 60 | 2 | 0 | 0 | 2 | H | 61 | Health rating of 2. Volatile |
| Benzyl alcohol | 3[e] | N/A | N/A | 2 | 2 | 0 | 4 | H | 205 | No FDA standards. Safety hazard |
| Aniline | 3[e] | N/A | N/A | 2 | 2 | 0 | 4 | H | 184 | No FDA standards. Safety hazard |
| Benzaldehyde | 3.5[e] | N/A | N/A | 2 | 2 | 0 | 4 | H | 179 | No FDA standards. Safety hazard |
| 2,2,2-Trifluoroethanol | 4[f] | N/A | N/A | 2 | 3 | 0 | 5 | H | 79 | No FDA standards. Safety hazard |
| N,N-dimethylformamide | 1[d] | 2 | 880 | 2 | 2 | 1 | 5 | H | 153 | Class 2 by FDA |
| a-Xylene | 2.5[a] | 2 | 2170 | 2 | 3 | 0 | 5 | H | 139 | Class 2 by FDA |
| Pyridine | 3.5[c] | 2 | 200 | 2 | 3 | 0 | 5 | H | 115 | Class 2 by FDA |
| Toluene | 2.5[a] | 2 | 890 | 2 | 3 | 0 | 5 | H | 110.6 | Class 2 by FDA |
| Tetrahydrofuran | 3.5[c] | 2 | 720 | 2 | 3 | 0 | 5 | H | 65 | Valatile. Class 2 by FDA |
| 1,4-Dioxane | 3[e] | 2 | 380 | 2 | 3 | 1 | 6 | J | 101 | Safety hazard |

Figure 6:
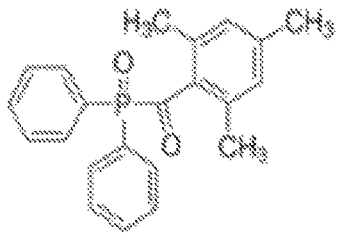
FIG. 6 is a figure demonstrating that Diphenyl(2,4,6-trimethylbenzoyl)phosphine oxide (DTPO) photoinitator enables effective crosslinking of poly(ε-caprolactone-co-α-allyl-ε-caprolactone) (PCL-ACPCL) at 405 nm.
Figure 6:
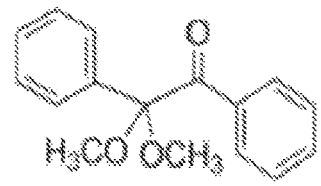
Figure 6:
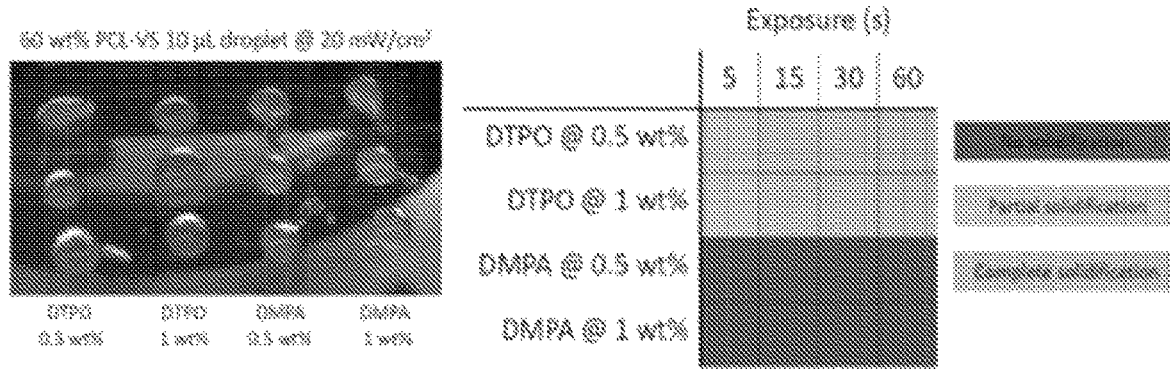

[1]PCL solubility at 25° C. based off of Bordes et al.[7]
[a]Only fully soluble for low conc at 14 kDa
[b]Not soluble at 25° C.
[c]All except partially for high concentrations at 65 kDa
[d]Partially souble at 14 kDa
[e]All except not soluble for high concentrations at 65 kDa
[2]FDA Classification of Solvent
[3]Acceptable parts per million (ppm) established by FDA
[4]NFPA Rating
[5]Safety Sum is the sum of Health, Flammability, and Reactivity NFPA ratings
[6]Personal protection equipment (PPE) Classifications
H = Splash goggles, gloves, protective apron, vapor respirator
J = Splash goggles, gloves, protective apron, dust respirator, vapor respirator
F = Safety glasses, gloves, protective apron, dust respirator In some embodiments, dimethyl sulfoxide (DMSO) may be used as the solvent. An initial solubility test showed that 20-40 wt/vol % PCL-ACPCL solutions were not fully soluble in DMSO at 37° C. after 4 hours of mixing (FIG. 6). However, heating the solution in a water bath to 40-45° C. resulted in full solubilization of the polymer at 50 and 70 wt/vol %. Higher concentrations of polymer are also soluble at these elevated temperatures. In other embodiments, the solvent may include methyl salicylate or acetophenone. The manufacture process as described herein and when utilizing the disclosed solvents has the added advantage of being conducted in a clean room environment without the need for expensive and cumbersome laminar flow hoods.

In addition to the precursor polymer and solvent, some precursor solutions as described herein may include a photoinitiator. A photoinitiator may be provided for initiating the cross-linking of a precursor polymer. In some embodiments, the photoinitiator may possess an absorbance wavelength of between 200 nm and 450 nm, more preferably about 400 nm, most preferably about 405 nm. It will be understood that the photoinitiator should have an absorbance wavelength that is similar to the light source emission wavelength. Various photoinitiators may be selected from, but not limited to, the following: acetophenone; anisoin; anthraquinone; anthraquinone-2-sulfonic acid; (benzene) tricarbonylchromium; benzil; benzoin; benzoin ethyl ether; benzoin isobutyl ether; benzoin methyl ether; benzophenone, 3,3',4,4'-benzophenonetetracarboxylic dianhydride; 4-benzoylbiphenyl, 2-benzyl-2-(dimethylamino)-4'-morpholinobutyrophenone; 4-4'-bis(diethylamino)benzophenone, 4-4'-bis(dimethylamino)benzophenone; camphorquinone; 2-chlorothioxanthen-9-one; (Cumen) cyclopentadienyrliron(II) hexaflurophosphate; dibenzosuberenone; 2,2-diethoxyacetophenone; 4,4'-dihydroxybenzophenone; 2,2-dimethoxy-2-phenylacetophenone; 4-(dimethylamino)benzophenone; 4-4'-dimethylbenzil; 2,5-dimethylbenzophenone; 3,4-dimethylbenzophenone; Diphenyl(2,4,6-trimethylbenzoyl) phospine oxide; 4'-ethoxyacetophenone; 2-ethylanthraquinone; Ferrocene; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; methybenzoylformate; 2-methyl-4'-(methylthio)-2morpholinopropio-phenone; phenanthrenequinone; 4;-phenoxyacetophenone; thioxanthene-9-one; triarylsulfonium hexafluoroantimonate salts; and triarylsulfonium hexaflurorphosphate salts.

A droplet test was conducted from two polymer solutions of 60 wt/vol % PCL-ACPCL in DMSO for two photoinitiators that absorb strongly at 405 nm: DTPO and DMPA (FIG. 6). The 10 µL droplets were exposed to 20 mW/cm2 irradiation at 405 nm for 5, 15, 30, and 60 seconds. Surprisingly, the droplets containing DTPO fully solidified within 15 seconds, whereas droplets containing DMPA did not appear to crosslink at all within 60 seconds.

Figure 7:
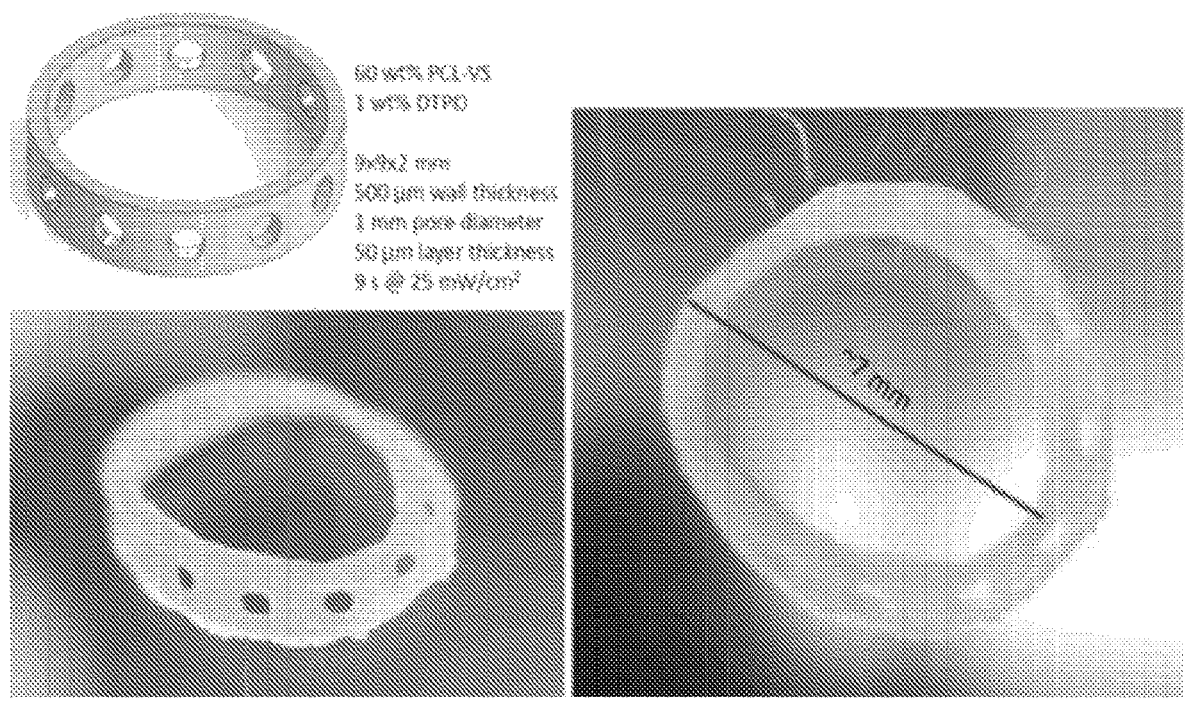
FIG. 7 includes a schematic and photographic images depicting successful printing of poly(ε-caprolactone-co-α-allyl-ε-caprolactone) (PCL-ACPCL) with a porous structure without the use of an absorber, demonstrating an absorber is not required to prevent crosslinking through the pores.

In some embodiments, products were manufactured which may include pores. Utilizing the manufacturing process as described herein, porous surfaces were maintained without any inclusion of photoabsorber or photoblocker. (FIG. 7) This may be advantageous as photoabsorbers can be toxic, and further this simplifies formulation and manufacturing requirements. In some embodiments, the articles may include a plurality of pores having an average final diameter of about 50 µm to about 5000 µm, about 500 µm to about 2000 µm, or about 1000 µm, even when no photoblocker is used.

Figure 2:
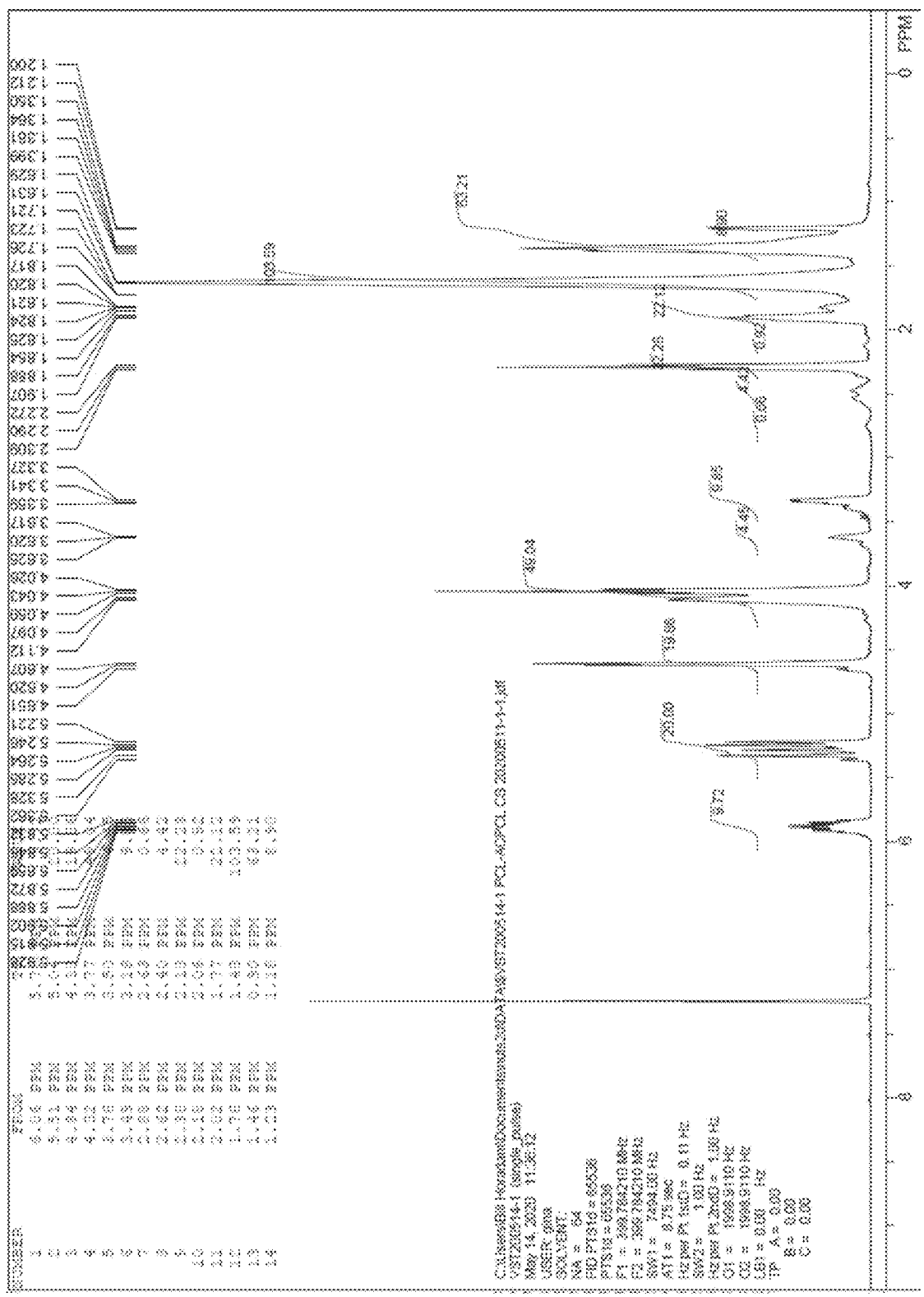
FIG. 2. is an NMR Spectrum of 59.7% PCL-40.3% ACPCL) (poly(ε-caprolactone-co-α-allyl-ε-caprolactone). $^1$H-NMR (400 MHz, CDCl$_3$, 25° C., TMS): δ=5.92 (m, 1H; —C$\underline{H}$=CH$_2$ (G$_i$)), 5.31 (m, 2H; —CH=C$\underline{H}_2$ (H$_{ii}$)), 4.63 (m, 2H; —CH=CH$_2$O (F$_{ii}$)), 4.15 (m, 2H; —OC$\underline{H}_2$ (e$_{ii}$)), 3.35 (m, 1H; —C$\underline{H}$—CH$_2$ (A$_i$)), 2.33 (t, $^3$J(H,H)=7.5 Hz, 2H; —C$\underline{H}_2$ (a$_{ii}$)), 1.96 (m, 2H; —C$\underline{H}_2$ (B$_{ii}$)), 1.62 (m, 4H; —C$\underline{H}_2$ (b$_{ii}$, d$_{ii}$)), 1.39 ppm (m, 2H; —C$\underline{H}_2$ (c$_{ii}$)).
Figure 3:
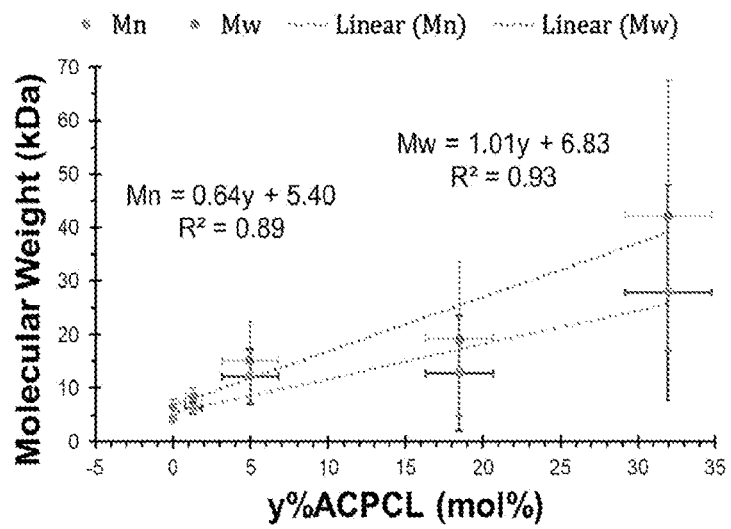
FIG. 3. is a graph depicting the effect of y % ACPCL on molecular weight properties. A moderate increase M, (less so in Mn) appears to accompany an increase in y % ACPCL as y is increased past 20%. The higher M, and polydispersity index (PDI, M$_w$/M$_n$) is consistent with previous studies and may be due to an increase in transesterification reactions at higher allyl compositions.

The disclosed manufacturing process may result in a polymerization product of a vinyl-functionalized precursor polymer with a photoinitiator and in some embodiments, a crosslinker. In certain embodiments, the vinyl-functionalized polymer may include, as an example, PCL-ACPCL which may have desirable properties for various biomedical and industrial applications. (See FIG. 1 and FIG. 2). For example, PCL-ACPCL may include properties such as switch-like shape recovery at or near body temperate (approx. 98° F.), good shape fixity, mechanical compliance, and in vitro biocompatibility. To meet these property requirements utilizing the manufacturing method as disclosed herein, PCL-ACPCL copolymers with melting temperatures and shape memory properties were determined. In some embodiments, molecular weights ranged from number average molecular weight ($M_n$) of approximately 5 to 40 kD (FIG. 3 and Table 2). There may be a moderate increase in molecular weight properties when y % ACPCL surpasses 20%, possibly due to the susceptibility of both PCL's polyester backbone and pendant allyl carboxylates to undergo transesterification reactions.

TABLE 2

Molecular Weight Characterization of PCL-ACPCL by GPC compared to Sigma PCL

| | Ret time | Mn | Mw | MP | Mz | Mz + 1 | PDI | % Area |
|---|---|---|---|---|---|---|---|---|
| PCL1 | 11.576 | 17010 | 22224 | 23578 | 26520 | 29953 | 1.3065 | 98.74 |
| PCL2 | 11.583 | 16908 | 22101 | 23446 | 26375 | 29788 | 1.3071 | 98.76 |
| PCL-ACPCL | 11.034 | 38904 | 43357 | 39525 | 56601 | 95920 | 1.1144 | 37.05 |
| | 11.785 | 8916 | 13595 | 19566 | 16954 | 19186 | 1.5246 | 58.74 |
| Average | 11.494 | 20514.87 | 25106.45 | 27285.81 | 32288.809 | 48865.452 | 1.224 | |

Figure 4:
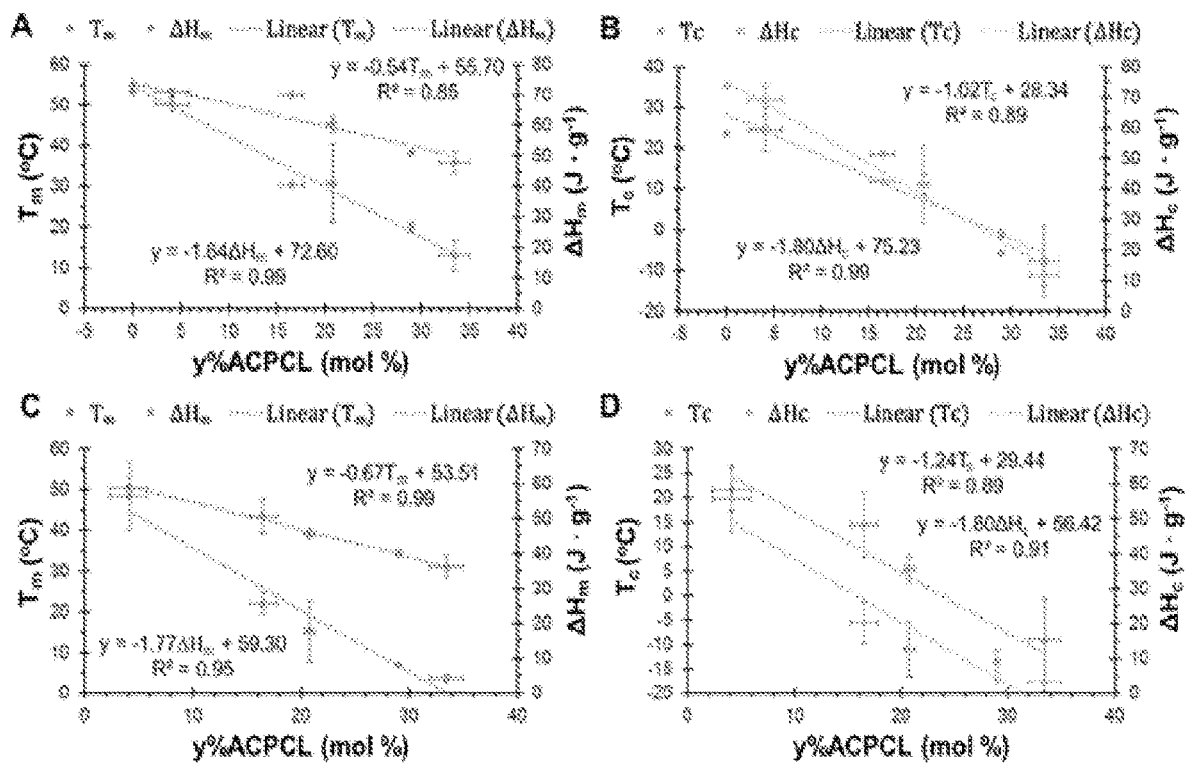
FIG. 4 is a graph depicting the effect of y % ACPCL on thermal properties. Increasing allyl content (y % ACPCL) results in a decrease in melting temperature (T$_m$), enthalpy of fusion (ΔH$_m$), crystallization temperature (T$_c$), and enthalpy of crystallization (ΔH$_c$) and indicates the strong dependence of thermal properties of this copolymer system on this molar ratio.

It may also be understood that increasing allyl content (y %) may result in a decrease in thermal properties such as melting temperature (Tm), enthalpy of fusion (ΔHm), crystallization temperature (Tc), and enthalpy of crystallization (ΔHc) (FIG. 4). This shift, however, may require a higher amount of allyloxycarbonyl substitution than previous copolymerization reactions to reach a Tm close to body temperature for the uncrosslinked polymers. Increasing y % from 0% to 20.8%±0.52% reduced Tm from 53.0±0.52° C. to just 45.3±2.2° C., which compares to a y=4-6% to achieve the same reduction with the previous copolymerization reaction (Table 3). Further increasing y % ACPCL may result in y=29.0% and 33.5±1.5% copolymers with melting temperature of 38.2±0.45° C. and 35.8±2.°7 C. This apparent disruption of PCL crystallinity also predictably coincides with a decrease in % crystallinity (Xc) and crystallization properties (Tc, ΔHc). Results are comparable for larger scale batches that range from y % ACPCL=31.6%, 35.9%, and 43.7%.

TABLE 3

Thermal Properties of Vinyl-Functionalized, Pre-SMPs

| y % in x % PCL-y % ACPCL | $T_m$ (° C.) | $\Delta H_m$ (J g$^{-1}$) | $X_C$ (%) | $T_c$ (° C.) | $\Delta H_c$ (J g$^{-1}$) | $T_g$ (° C.) |
|---|---|---|---|---|---|---|
| 0% (10 kD PCL) | 53.0 ± 0.6 | 73..3 ± 2.4 | 52.6 ± 1.7 | 23.6 ± 0.55 | 73.7 ± 0.49 | −66.5 ± 0.79 |
| 4.1 ± 1.8% | 53.1 ± 1.0 | 66.7 ± 2.5 | 47.8 ± 1.8 | 24.5 ± 5.4 | 69.3 ± 5.1 | −66.9 ± 0.35 |
| 16.51 ± 1.3% | 52.5 ± 2.1 | 41.2 ± 1.1 | 29.5 ± 0.75 | 19.3 ± 0.74 | 42.6 ± 0.11 | −56.4 ± 2.6 |
| 20.8 ± 0.52% | 45.3 ± 2.1 | 41.0 ± 12.8 | 29.4 ± 9.2 | 11.1 ± 2.4 | 41.4 ± 12.8 | −52.8 ± 4.1 |
| 29.0% | 38.2 ± 0.45 | 26.6 ± 1.6 | 19.0 ± 1.1 | −5.64 ± 0.58 | 25.3 ± 1.3 | −49.5 ± 1.9 |
| 33.5 ± 1.5% | 35.8 ± 2.7 | 17.3 ± 4.8 | 12.4 ± 3.5 | −7.62 ± 8.8 | 11.9 ± 3.3 | −53.7 ± 1.5 |

Crosslinking the polymers under UV light to form covalent bonds between the allyl groups of polymer chains may further disrupt PCL crystallization and in turn further reduce Tm, ΔHm, Tc, ΔHc (FIG. 4 and Table 4). In crosslinked form, increasing y from 4.1±1.8% to 20.8±0.52%, 29.0%, and 33.5±1.5% decreased the melting temperature from 50.4±2.20 C to 39.1±1.1° C., 34.4±0.51° C. and 31.0±2.7° C., respectively. Similar trends were observed for other properties and are comparable in larger scale batches with y % ACPCL=31.6%, 35.9%, and 43.7% (Table 5).

TABLE 4

Thermal Properties of Vinyl-Functionalized SMPs

| y % in x % PCL-y % ACPCL | $T_m$ (° C.) | $\Delta H_m$ (J g$^{-1}$) | $X_C$ (%) | $T_c$ (° C.) | $\Delta H_c$ (J g$^{-1}$) | $T_g$ (° C.) |
|---|---|---|---|---|---|---|
| 4.1 ± 1.8% | 50.4 ± 2.2 | 56.5 ± 9.7 | 40.5 ± 6.9 | 21.6 ± 4.4 | 55.6 ± 9.5 | −51.4 ± 4.5 |
| 16.51 ± 1.3% | 43.5 ± 4.2 | 25.8 ± 3.0 | 18.5 ± 2.2 | 14.4 ± 6.6 | 20.3 ± 5.9 | −47.6 ± 3.7 |
| 20.8 ± 0.52% | 39.1 ± 1.2 | 17.8 ± 8.7 | 12.7 ± 6.3 | 5.45 ± 2.7 | 12.6 ± 8.0 | −48.8 ± 3.4 |
| 29.0% | 34.4 ± 0.51 | 8.09 ± 0.32 | 5.80 ± 0.23 | −13.6 ± 2.3 | 3.55 ± 0.39 | −51.0 ± 4.4 |
| 33.5 ± 1.5% | 31.0 ± 2.7 | 4.28 ± 1.3 | 3.06 ± 0.96 | −9.15 ± 8.5 | 3.04 ± 2.5 | −50.5 ± 2.9 |

TABLE 5

Thermal properties of 68% PCL-32% ACPCL synthesized on larger scale

| y % in x % PCL-y % ACPCL | $T_m$ (° C.) | $\Delta H_m$ (J g$^{-1}$) | $X_C$ (%) | $T_c$ (° C.) | $\Delta H_c$ (J g$^{-1}$) | $T_g$ (° C.) |
|---|---|---|---|---|---|---|
| Before crosslinking | 38.2 ± 0.13 | 15.8 ± 7.1 | 11.3 ± 5.1 | 0.40 ± 0.25 | 10.9 ± 4.4 | −52.8 ± 0.10 |
| After crosslinking | 32.8 ± 2.8 | 4.94 ± 1.6 | 3.54 ± 1.2 | −16.3 ± 5.1 | 4.31 ± 3.2 | −50.6 ± 4.0 |

Figure 5:
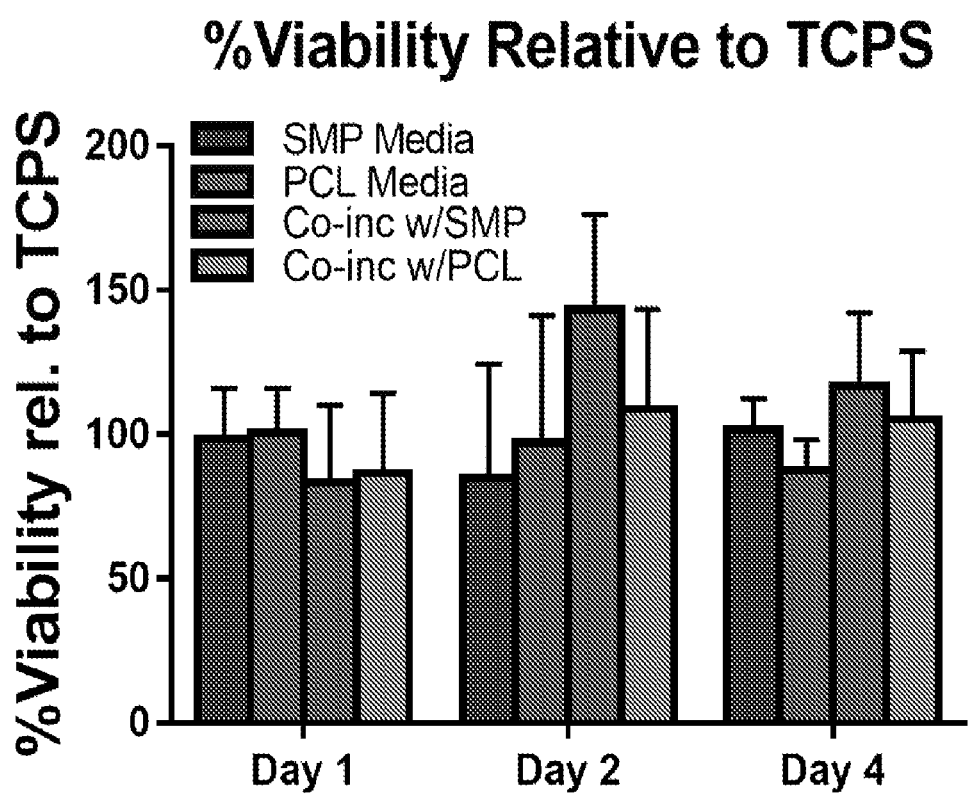
FIG. 5 is a plot of cell viability in vitro when incubated with media leached from SMPs or PCL control, or in the presence of SMP and PCL films. These SMPs appear to possess similar or better biocompatibility than PCL

It is essential for biomaterials to demonstrate adequate biocompatibility for use in biomedical applications. To assess this, an in vitro test was conducted on these PCL-ACPCL SMPs (FIG. 5). Human dermal fibroblast cells transfected with red fluorescent protein (HDF-RFPs) were seeded at a density of 6300 cells/cm$^2$ onto TCPS. After seeding, cells were supplemented with either fresh DMEM media or media leached from a 24-hour incubation with polymer films ("SMP Media" or "PCL Media"). In another test group ("Co-inc"), polymer disks were transferred into wells 30 minutes after supplementing with fresh media. At 24, 48, and 96 hours timepoints, an equal volume of Cell Titer Glo solution was added to the media of each well and plates were imaged on an IVIS Lumina Ill imaging system to detect luminescence. The total number of viable cells in each well was calculated by a standard curve of total flux (p/s) generated by TCPS controls, and % viability was calculated normalized to TCPS controls of the same seeding density. Similar to PCL controls, greater than 80% viability was maintained with these test groups relative to TCPS with unadulterated media over the course of 4 days (N=2-3 biological replicates, 4 technical replicates each).

As disclosed herein, the manufacturing process may produce an article comprising the polymerization product of a precursor polymer and a photoinitiator. In some embodiments, the precursor polymer may include a vinyl-functionalized polymer. In some embodiments, the precursor polymer may include a vinyl-functionalized shape memory polymer. In yet other embodiments, the precursor polymer may include a polycaprolactone polymer. In further embodiments, the precursor polymer may include PCL-ACPCL. In some embodiments, the precursor polymer may include the polymer structure as disclosed in other portions of this application. As disclosed herein, the photoinitiator may be DTPO.

In some embodiments, the manufacturing process may produce an article comprising the polymerization product of a precursor polymer, a photoinitiator, and a crosslinker. The precursor polymer and photoinitiator may be as described previously. In some embodiments, the crosslinker may include an acrylate crosslinker. In some embodiments, the crosslinker may include an alkylene oxide crosslinker, with the alkylene oxide crosslinker comprising acrylate end-groups. In certain embodiments, the crosslinker may include polyethylene glycol diacrylate. In yet further embodiments, the precursor polymer or crosslinker may include D,L-dithiolthreitol (DTT), or other labile bonds such as anhydrides, or variants thereof.

Figure 8:
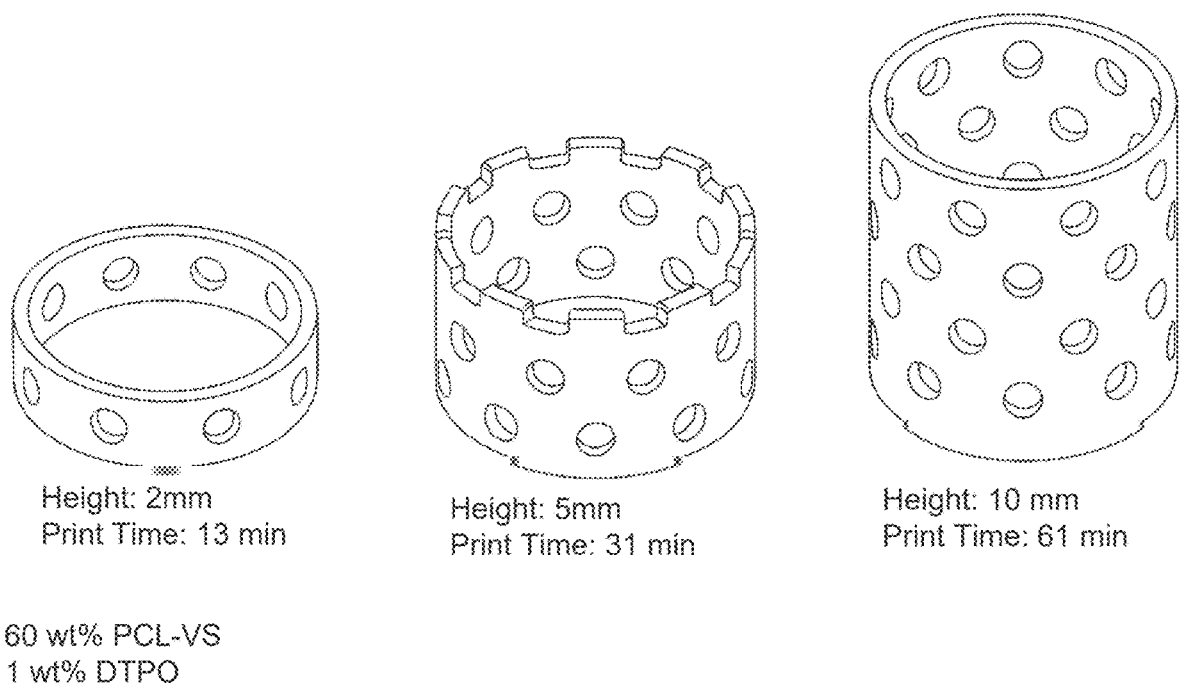
FIG. 8 is a schematic depicting how taller objects can be printed from -poly(ε-caprolactone-co-α-allyl-ε-caprolactone) (PCL-ACPCL) with more efficient heating during printing.
Figure 9:
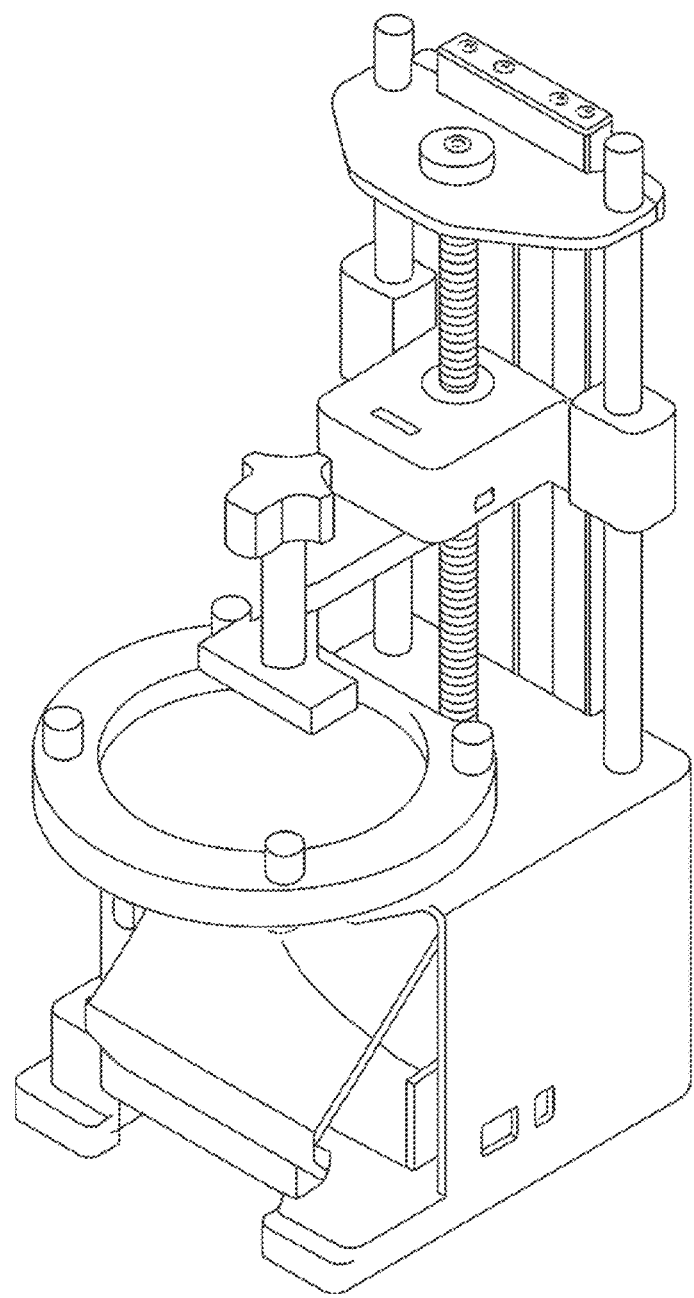
FIG. 9 is a schematic of the device re-design to enable heating during printing by incorporating a heating element.

The manufacturing methods disclosed herein, and the articles produced therefrom, may require acrylate crosslinkers to produce larger and/or more intricate structures. Larger, taller structures can be printed with more efficient heating to maintain solubility of the polymer, photoinitiator, and any other components in the precursor solution (FIG. 8). To accomplish this, heating elements such as those depicted in FIG. 9 and FIG. 10 can be implemented into the manufacturing devices, such as SLA-based or digital light processing printers, to both help maintain solubility of formula components and prevent adherence of the moving z-platform, which contains the crosslinked in-process product, to the dish, which contains the precursor solution, due to increased viscosity of the solution at lower temperatures. In some embodiments, only heating under the dish containing the solution, and not a heated block around the solution, is needed for taller applications.

It may be desired to speed up production of larger, taller structures, as this may be important to not only save time and money, but also to maintain solubility of polymer solutions and limit the increase in viscosity from reduced temperatures. In certain embodiments, precursory solutions containing 250 Da poly(ethylene glycol) diacrylate (PEGDA) may be utilized to increase the efficacy of producing larger structures (Table 6). In some embodiments, the PEGDA may be from about 1% to about 200% b/w of the solution. In some embodiments, the PEGDA may be from about 5% to about 15% b/w of the solution. In certain embodiments, the PEGDA may be 5%, 10%, or 14.3% b/w of the solution (Table 6).

TABLE 6

Addition of low MW PEGDA to formulation results in consistent manufacturing.

| [PCL-VS] | [PEGDA250] | [DTPO] | Exposure (s) | Print time (min) | Result |
|---|---|---|---|---|---|
| 60* | 0 | 1 | 6.5 | 49 | Prints okay |
| 60 | 0 | 2 | 3.25 | 26 | Delamination |
| 60 | 14.3 | 1 | 4.5 | 30 | Prints well |
| 60 | 14.3 | 1 | 3.75 | 28 | Prints well |
| 60 | 10 | 1 | 4.5 | 28 | Prints well |

TABLE 6-continued

Addition of low MW PEGDA to formulation results in consistent manufacturing.

| [PCL-VS] | [PEGDA250] | [DTPO] | Exposure (s) | Print time (min) | Result |
|---|---|---|---|---|---|
| 60 | 5 | 1 | 4.5 | 28 | Prints well |
| 60 | 5 | 1 | 3.5 | 26 | Prints well |
| 60 | 5 | 1 | 2.75 | 24 | Prints well |
| 60** | 10 | 1 | 3.5 | 20 | Prints well |

Figure 12:
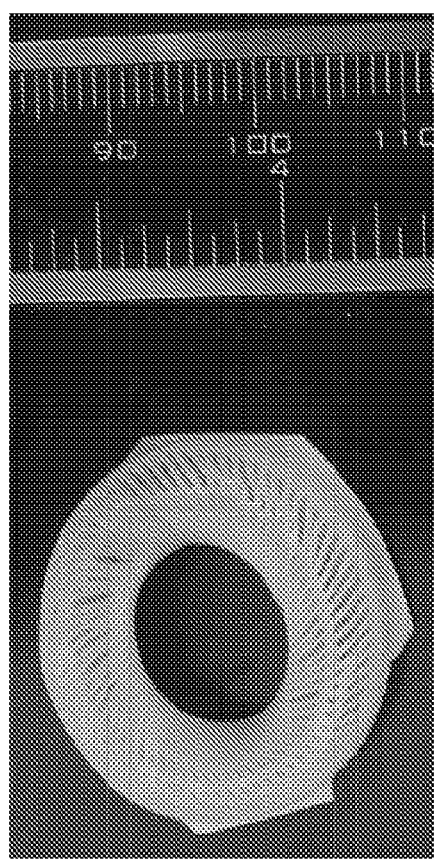
FIG. 12 is a photomicrograph of an intricate interwoven design with the SMP formulation containing PEGDA.

* Printed at 50 μm layer thickness
** Printed 800 μm diameter pore at 100 μm layer thickness Solubility of solutions were maintained after mixing in the PEGDA. 3D printing results indicated that inclusion of PEGDA resulted in taller prints printing well and lower exposure times, whereas in the absence of PEGDA, UV exposure time needed to be doubled to prevent delamination, and even under those conditions, the quality of the print was inferior to that which included some amount of PEGDA. Addition of PEGDA to solutions increased the rigidity, tenability, and consistency of prints. Taller, more complex designs such as stents may be printed with success by inclusion of PEGDA and altering of the exposure time (FIG. 11). Very intricate, interwoven designs may also be printed with SMP formulations containing PEGDA (FIG. 12), indicating robust printing capabilities for a variety of biomedical and industrial applications.

To test whether the combination of vinyl-functionalized SMPs with alkylene oxide crosslinkers are biocompatible, one of the formulations was tested for cytotoxicity and acute systemic toxicity according to internationally-recognized standards ISO 10993-5 and 10993-11. For ISO 10993-5 testing, the L929 Neutral Red Uptake Test (1 Concentration) was used. In this test, the potential biological reactivity of a mammalian cell culture (mouse fibroblast L929) in response to exposure to the extract of the test article, SMP w/ PEGDA, was determined. The test article was extracted in Minimum Essential Medium (MEM) with 10% Fetal Bovine Serum (referred to as complete MEM) for 72±2 hours at 37±1° C. Negative and positive controls were prepared similarly (Table 7). The maintenance medium of L929 cells grown in 96-well plates was replaced with the 100% (neat) extracts of the test and control articles in 6 replicates, and the cells were incubated for 24 to 26 hours at 37±1° C. The viability of cells following the exposure to the extracts was measured via their capacity to uptake a vital dye, Neutral Red. This dye was added to the cells to be actively incorporated in viable cells. The number of viable cells correlates to the color intensity determined by photometric measurements after extraction.

TABLE 7

Summary of samples used for ISO 10993-5 Cytotoxicity Test

| Sample | Amount | Vehicle | Volume | Ratio | Time/Temperature |
|---|---|---|---|---|---|
| Test Article | 37.9 cm$^2$ | complete MEM | 12.6 mL | 3 cm$^2$/mL | 72 ± 2 hours at 37 ± 1° C. |
| Positive Control | 30 cm$^2$ | complete MEM | 10.0 mL | 3 cm$^2$/mL | 72 ± 2 hours at 37 ± 1° C. |
| Negative Control | 30 cm$^2$ | complete MEM | 10.0 mL | 3 cm$^2$/mL | 72 ± 2 hours at 37 ± 1° C. |
| Untreated Control | N/A | complete MEM | 10.0 mL | N/A | 72 ± 2 hours at 37 ± 1° C. |

Figure 13:
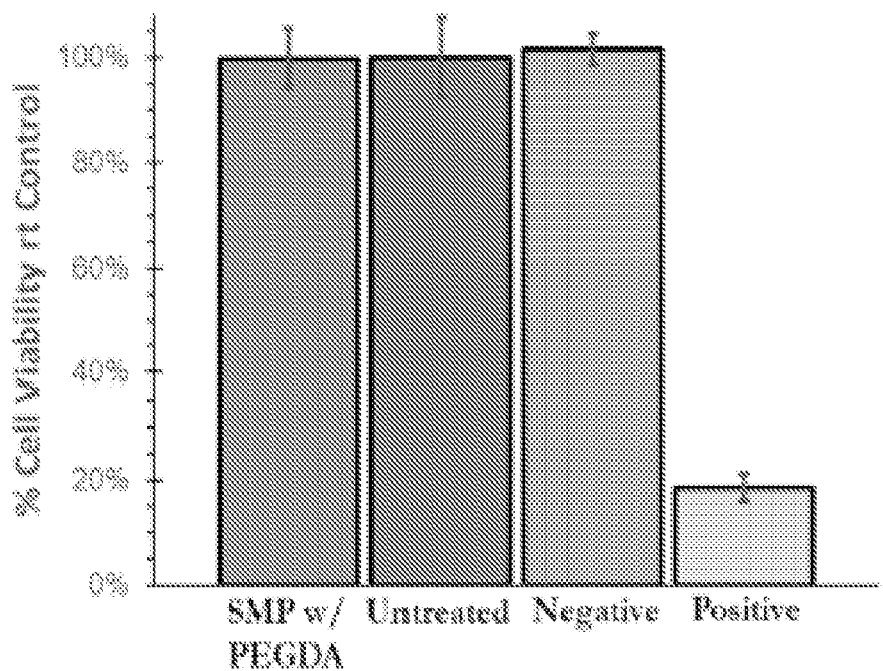
FIG. 13 is a graph of cell viability from media leached out of an SMP formulation containing PEGDA compared to controls, in accordance with ISO 10993-5 testing standards. This formulation has "no potential cytotoxicity."

The viability percentage of the cells exposed to the 100% (neat) test article extract was 100% (99.7±5.8%, FIG. 13). The viability percentage of the cells exposed to the negative and positive control articles were greater and lower than 70%, respectively, confirming the validity of the assay. Based on the criteria of the protocol and the ISO 10993-5 guidelines, the test article meets the requirements of the test and is not considered to have a cytotoxic potential The ISO 10993-11 acute systemic toxicity testing involved first extracting vinyl-functionalized SMPs with alkelyne oxide crosslinker samples at 3 cm^2 per mL at 50° C. for 72 hours in either 1) 0.9% NaCl, or 2) Cotton Seed Oil. The NaCl extracts were injected intravenously at 50 mL/kg at 2 mL/min, while Cotton Seed Oil extracts were injected intraperitoneally at 50 mL/kg. Animals were observed for clinical signs immediately after injection, and then 4, 24, 48, and 72 hours after injection. Animals were also weighed at 24, 48, and 72 hours. In 20 total Albino Swiss female mice (5 NaCl from SMP with PEGDA, 5 NaCl negative control, 5 CSO from SMP with PEGDA, 5 CSO negative control), no adverse clinical signs (e.g. respiratory, motor activities, convulsion, reflexes, ocular signs, cardiovascular signs, salivation, piloerection, analgesia, muscle tone, gastrointestinal, skin) or weight loss >1% were observed from SMP with PEGDA or negative controls (Table 8). As such, SMP with PEGDA did not induce a significantly greater biological reaction than the negative control, and meets the requirements of ISO 10993-11 guidelines.

tracked over the course of an exposure sequence (Table 9). The formulation should possess viscosities high enough for adequate crosslinking, but low enough that the solution may still flow well at from about 30° C. to about 60° C. In some embodiments, the viscosity may be more than approximately 15 kPa*s, a Gel Point less than about 30 s (this is within a few seconds of exposure), and a Slope During Exposure of approximately 230 kPa/s. Crosslinked polymers are also characterized by submersive mechanical testing in 37° C. saline; wet Young's moduli can vary between approximately 0.05-100 MPa for these chemistries.

TABLE 9

Mechanical, and Photorheology Data of 3 Shape Memory Polymer Batches containing 15.

|  | Exposure time (s) | Wet Modulus | Viscosity (kPa * s) | Gel Point (s) | Slope (kPa/s) |
| --- | --- | --- | --- | --- | --- |
| Contract | 1.2 | 0.41 | 23.3 | 23.4 | 228.8 |
| Batch 1 | 2.0 | "Stiffer" | 31.4 | 22.8 | 227.8 |
| Batch 2 | 2.8 | "Very Stiff" | N/A | 29.0 | 216.0 |

Wet Young's Modulus at 37° C. for Batch 2, "Very Stiff", was 3.81 MPa.

Several different formulation concentrations were evaluated by thermal and mechanical characterization using differential scanning calorimetry (DSC) and a dynamic mechanical analyzer (DMA), respectively, in order to determine the influence of crosslinkers on these critical properties (Table 10). The characterization work demonstrated that the

TABLE 8

Animal Weights and Clinical Observations

| Group | Animal # | Sex | Dose (mL) | Body Weight (g) | | | | Weight Change | Signs of Toxicity* |
| --- | --- | --- | --- | --- | --- | --- | --- | --- | --- |
| | | | | Day 0 Sep. 30, 2018 | Day1 Oct. 1, 2019 | Day 2 Oct. 2, 2018 | Day 3 Oct. 3, 2018 | | |
| NaCl Test | 1 | Female | 1.0 | 20.5 | 20.5 | 21.5 | 21.4 | 0.9 | None |
| IV | 2 | Female | 1.2 | 23.3 | 23.5 | 24.1 | 23.8 | 0.5 | None |
| 2 mL/min | 3 | Female | 1.0 | 20.3 | 20.6 | 21.8 | 21.2 | 0.9 | None |
| 50 mL/kg | 4 | Female | 1.1 | 21.3 | 21.0 | 21.3 | 21.2 | −0.1 | None |
| | 5 | Female | 1.0 | 20.4 | 19.7 | 20.7 | 21.5 | 1.1 | None |
| NaCl Control | 6 | Female | 1.0 | 20.6 | 20.3 | 20.4 | 20.4 | −0.2 | None |
| IV | 7 | Female | 1.0 | 20.7 | 19.8 | 20.1 | 20.8 | 0.1 | None |
| 2 mL/min | 8 | Female | 1.0 | 19.1 | 20.0 | 20.3 | 20.3 | 1.2 | None |
| 50 ml/kg | 9 | Female | 1.0 | 20.2 | 20.3 | 20.4 | 20.6 | 0.4 | None |
| | 10 | Female | 1.1 | 21.9 | 22.1 | 22.5 | 22.7 | 0.8 | None |
| CSO Test | 11 | Female | 1.0 | 20.3 | 19.5 | 20.3 | 20.2 | −0.1 | None |
| IP | 12 | Female | 1.2 | 23.5 | 22.7 | 22.9 | 23.5 | 0.0 | None |
| 50 mL/kg | 13 | Female | 1.1 | 22.9 | 21.7 | 22.5 | 22.9 | 0.0 | None |
| | 14 | Female | 1.1 | 22.1 | 21.6 | 23.0 | 22.9 | 0.8 | None |
| | 15 | Female | 1.2 | 23.7 | 23.7 | 24.4 | 25.3 | 1.6 | None |
| CSO Control | 16 | Female | 1.0 | 20.5 | 20.7 | 20.9 | 21.9 | 1.4 | None |
| IP | 17 | Female | 1.0 | 20.5 | 20.8 | 21.1 | 20.8 | 0.3 | None |
| 50 mL/kg | 18 | Female | 1.0 | 20.9 | 21.0 | 20.9 | 21.1 | 0.2 | None |
| | 19 | Female | 1.1 | 21.4 | 22.1 | 22.9 | 22.7 | 1.3 | None |
| | 20 | Female | 1.1 | 22.1 | 22.6 | 23.2 | 23.3 | 1.2 | None |

*Summary of clinical observations, Immediately, 4, 24, 48, and 72 hours after injection.
IV = Intravenous Route
IP = Intraperitoneal Route The vinyl-functionalized SMP with PEGDA formulation also met the requirements of ISO 10993-6 at a two week endpoint, which evaluates inflammation around the implant. Therefore, the vinyl-functionalized SMPs may be biocompatible.

For vinyl-functionalized and/or shape memory polymer formulations, photorheology is used in which the polymer solution is exposed to 20 mW/cm$^2$ while undergoing 1% strain at 5 rads/sec, and the storage and loss modulus are presence of the crosslinkers does not alter the melting temperature of the polymer product. In some embodiments, low molecular weight PEGDA and high molecular weight PEGDA were evaluated for these critical properties. Increasing the low molecular weight (LMW) crosslinker concentrations to 5%, 10%, and 15% increased the Dry Young's Modulus at 37° C. ((E'(37° C.)) from 0.246 MPa to 0.267, 0.626, and 1.336 MPa, respectively. In contrast, the high molecular weight (HMW) crosslinker concentration hardly altered the stiffness of the material. As the LMW crosslinker does not alter the melting temperature, and an initial assessment of SMP properties via thermomechanical cycling did not detect a significant difference in shape recovery or fixity, it was deemed that the LMW crosslinker can safely be implemented into the formulation. In some embodiments utilizing the LMW crosslinker, degradation of the PCL-based SMP constructs may be significantly increased. In some embodiments, HMW crosslinkers may be implemented into formulations to alter degradation times without much altering of the mechanical stiffness. Likewise, exposure time can be increased to increase mechanical stiffness without much altering of degradation timelines.

TABLE 10

Thermal and Mechanical Properties of SMPs with different crosslinkers.
Top values = mean, bottom values = SD.

| | $T_m$ (° C.) | $\Delta H_m$ (J/g) | $T_C$ (° C.) | $\Delta H_C$ (J/g) | $T_g$ (° C.) | E'(37° C.) (MPa) | $\sigma_{max}$ (MPa) | $E_{max}$ (%) |
|---|---|---|---|---|---|---|---|---|
| Pre-SMP | 38.3 | 22.7 | −1.9 | 23.3 | −51.5 | N/A | N/A | N/A |
| | 2.1 | 0.7 | 0.6 | 2.1 | 4.3 | | | |
| SMP | 31.4 | 9.5 | −15.7 | 5.7 | −76.4 | 0.246 | 0.078 | 82.3 |
| | 1.0 | 1.0 | 1.4 | 0.5 | 0.4 | 0.127 | 0.017 | 75.6 |
| SMP + 5% LMW | 31.1 | 6.0 | −21.4 | 2.3 | −75.0 | 0.267 | 0.036 | 26.8 |
| | 3.0 | 0.7 | 0.9 | 1.1 | 0.4 | 0.121 | 0.020 | 7.4 |
| SMP + 5% HMW | 32.0 | 11.4 | −14.0 | 5.9 | −52.2 | 0.159 | 0.079 | 58.2 |
| | 0.6 | 0.7 | 1.0 | 0.1 | 1.9 | 0.066 | 0.049 | 53.4 |
| SMP + 10% LMW | 32.4 | 5.8 | −22.4 | 0.8 | −66.6 | 0.626 | 0.094 | 25.8 |
| | 0.2 | 1.0 | 1.8 | 0.2 | 8.1 | 0.084 | 0.007 | 12.6 |
| SMP + 10% HMW | 31.8 | 20.0 | −11.9 | 7.9 | −70.0 | 0.268 | 0.093 | 47.9 |
| | 1.3 | 1.2 | 1.0 | 4.8 | 11.0 | 0.053 | 0.029 | 11.0 |
| SMP + 15% LMW | 32.9 | 4.7 | −19.9 | 1.5 | −75.2 | 1.336 | 0.121 | 21.2 |
| | 1.4 | 0.2 | 1.0 | 0.7 | 1.3 | 0.362 | 0.107 | 18.0 |
| SMP + 15% HMW | 32.0 | 18.8 | −0.8 | 16.5 | −73.1 | 0.349 | 0.065 | 29.9 |
| | 3.6 | 6.8 | 1.2 | 6.5 | 1.4 | 0.133 | 0.051 | 34.2 |

Pre-SMP = vinyl-functionalized polymer prior to photocrosslinking
SMP = shape memory polymer
LMW = low molecular weight crosslinker
HMW = high molecular weight crosslinker As higher molecular weight crosslinkers dominate more of the mole percentage of copolymer systems than lower molecular weight crosslinkers do at the same weight percentage, degradation rates could be sped up with increased molecular weight if the crosslinker degrades faster than the base polymer. In other embodiments, longer polymer chains could take longer to degrade.

Figure 14:
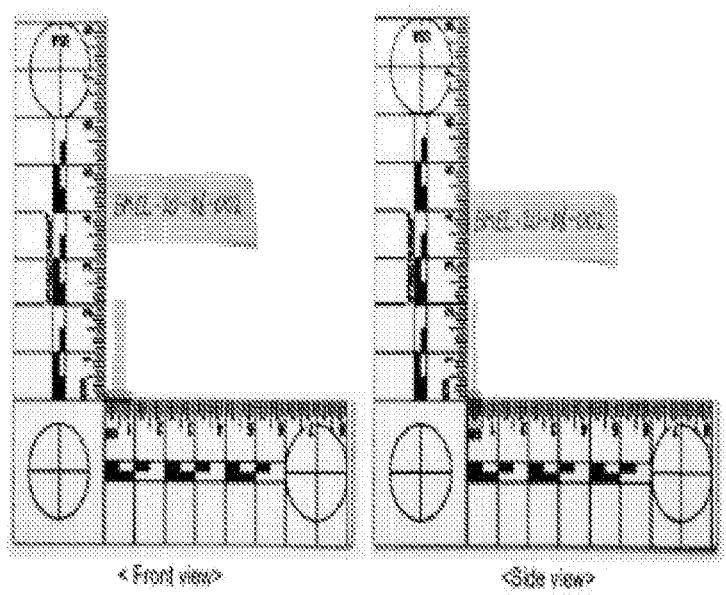
FIG. 14 is a diagram and photomicrograph of dogbone-shaped SMP samples with 100% HMW crosslinker for tensile mechanical testing.
Figure 14:
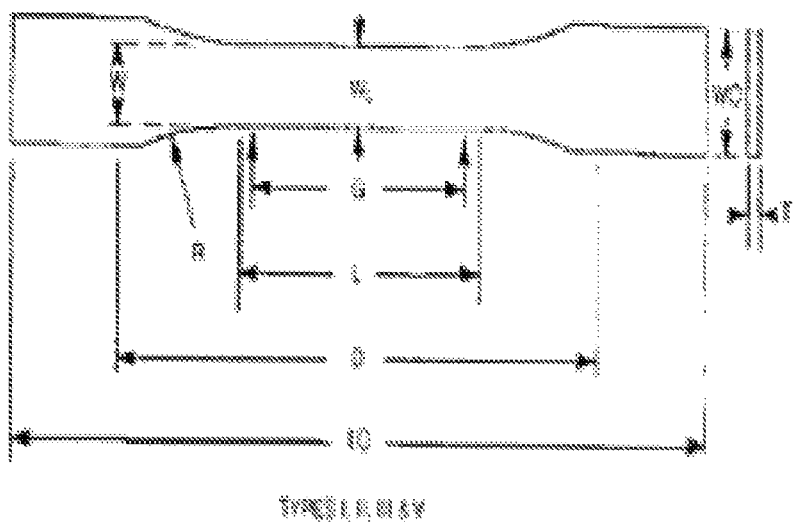

In some embodiments, the formulation may include the weight percent of high molecular weight (HMW) crosslinker from about 15% to 100%. (FIG. 14). This large increase in the weight % of HMW crosslinker may cause the SMP to become stiffer (Table 11). However, samples were only tested at room temperature in dry conditions, with a Young's modulus at 20° C. of 5.58±0.92 MPa observed; it is anticipated that the composition is softer in physiological conditions (e.g. 37° C. submerged in PBS) than 5.58 MPa.

TABLE 11

Ambient Mechanical Properties of 3D-Printed SMP dogbones with 100 wt % HMW

| | E'(20° C.) (MPa) | $\sigma_{max}$ (MPa) | $E_{max}$ (%) |
|---|---|---|---|
| SMP w/100% HMW | 5.58 ± 0.92 | 1.50 ± 0.18 | 0.45 ± 0.092 |

Figure 15:
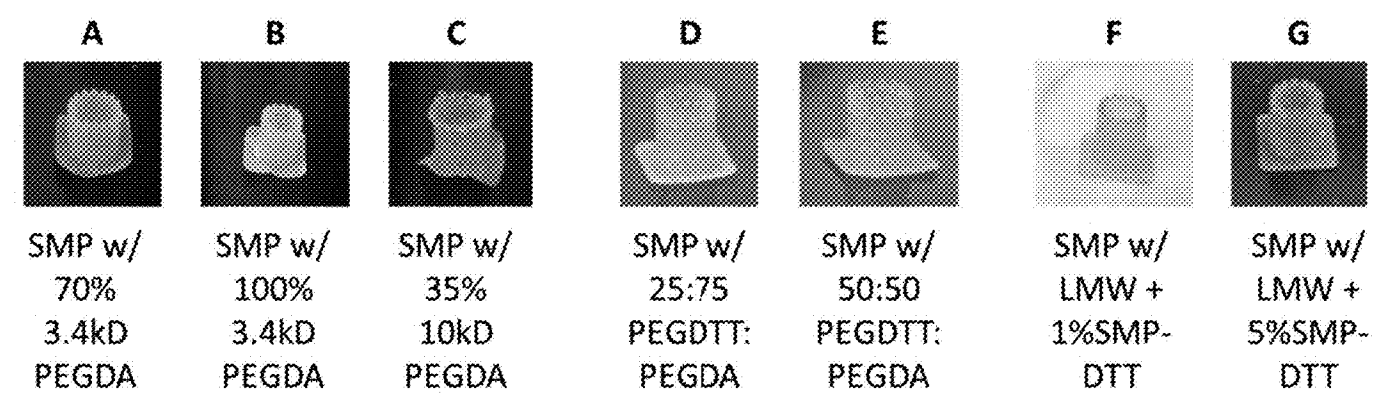

Porous cylinders 10 mm in height were successfully printed from various formulations of vinyl-functionalized SMPs (Table 12, FIG. 15). In some embodiments, PCL-ACPCL may be included as the base polymer with a molecular weight between 10 and 40 kD. Further other various molecular weights of PEGDA may be included as the crosslinker.

TABLE 12

Printing results from various molecular weight crosslinkers

| PEGDA MW | wt % PEGDA | wt % PCL-ACPCL | Actual PEG wt % | Actual PCL-ACPCL wt % | PEG monomers | PC/ACPCL monomers | mol % PEG | mol % PCL-ACPCL |
|---|---|---|---|---|---|---|---|---|
| 250 | 15 | 70 | 17.6% | 74.7 | 75 | 6090 | 1.2% | 98.8% |
| 3400 | 15 | 70 | 17.6% | 74.7 | 1155 | 6090 | 15.9% | 84.1% |
| 3400 | 70 | 70 | 50.0% | 71.0 | 5390 | 6090 | 47.0% | 53.0% |
| 3400 | 100 | 70 | 58.8% | 70.7 | 7700 | 6090 | 55.8% | 44.2% |
| 10000 | 15 | 70 | 17.6% | 74.7 | 3405 | 6090 | 35.9% | 64.1% |
| 10000 | 35 | 70 | 33.3% | 72.0 | 7945 | 6090 | 56.6% | 43.4% |
| 10000 | 70 | 70 | 50.0% | 71.0 | 15890 | 6090 | 72.3% | 27.7% |
| 10000 | 100 | 70 | 58.8% | 70.7 | 22700 | 6090 | 78.8% | 21.2% |
| 35000 | 15 | 70 | 17.6% | 74.7 | 11910 | 6090 | 66.2% | 33.8% |
| 35000 | 35 | 35 | 50.0% | 36.0 | 27790 | 3045 | 90.1% | 9.9% |

It will be understood that any medical device placed inside the body may require some form of sterilization technique which can alter material properties. The most common methods of sterilization in industry are ethylene oxide treatment, gamma irradiation, and e-beam irradiation, all of which can induce material property changes. In some embodiments, ethylene oxide treatments may be used to sterilize products produced from the disclosed process herein. To consider the effects of the ethylene oxide treatments on mechanical properties, dogbone-shaped samples were prepared and tested under tensile strain while submerged in PBS at 37° C. (Table 13). For a certain vinyl-functionalized SMP composition, the Young's modulus at 37° C. was 2.5× and 1.9× that of the samples prior to ethylene oxide treatment with the 1× and 2× cycle samples, respectively. Given this result, the upper range of mechanical stiffnesses possible from vinyl-functionalized SMPs may be 2-3× that measured on the upper end.

TABLE 13

Physiological Mechanical Properties of 3D-Printed SMP dogbones after Ethylene Oxide Treatment

| | E'(37° C.) (MPa) | $\sigma_{max}$ (MPa) | $E_{max}$ (%) |
|---|---|---|---|
| SMP | 0.682 ± 0.075 | 0.239 ± 0.63 | 0.548 ± 0.11 |
| SMP with 1x EtO sterilization | 1.72 ± 0.61 | 0.318 ± 0.51 | 0.413 ± 0.16 |
| SMP with 2x EtO sterilization | 1.31 ± 0.32 | 0.326 ± 0.48 | 0.489 ± 0.13 |

1x EtO = one cycle of ethylene oxide sterilization
2x EtO = two cycles of ethylene oxide sterilization Aside from varying the extent of vinyl or allyl functionalization, the amount of vinyl- and alkelyne oxide-functionalized polymer, molecular weight of each polymer component, and exposure time to alter thermal, mechanical, and degradation properties, some embodiments may include additional chemistries which may be incorporated in the formulations used for photocuring. This can be done in the form of functionalizing the existing polymers in the formulation, or through adding an additional component to the formulation such as a crosslinker, photoabsorber, or both.

For example, additional hydrolytically degradable ester groups can be incorporated or added into the photocurable formulations. One facile way of doing this is to vary the extent of allyl carboxylate functionalization of polymers such as PCL to tune thermal, mechanical, and/or degradation properties.

In some embodiments, altering thermal, mechanical, and degradation properties of vinyl-containing, or vinyl- and alkelyne oxide-containing polymers, includes functionalizing the vinyl and/or acrylate groups with labile bonds such as polyanhydrides or thiol group(s). In one embodiment, the structure may include the following:

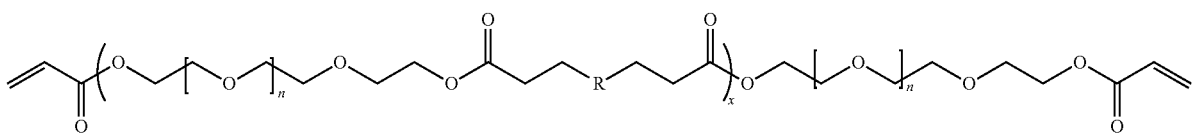

where R=molecule containing a labile bond such as an anhydride or thiol group(s), n=an integer from about 1-100, and x=2.

In some embodiments, the structure may include the following:

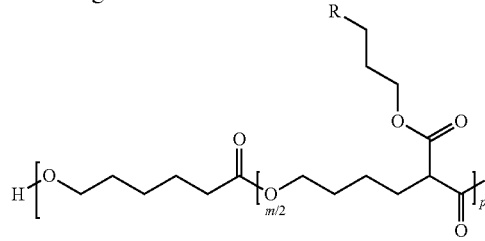

where R=molecule containing a labile bond such as anhydride or thiol group(s), m=an integer from about 1-300, n=an integer from about 1-300, p=an integer from about 1-300.

Figure 16:
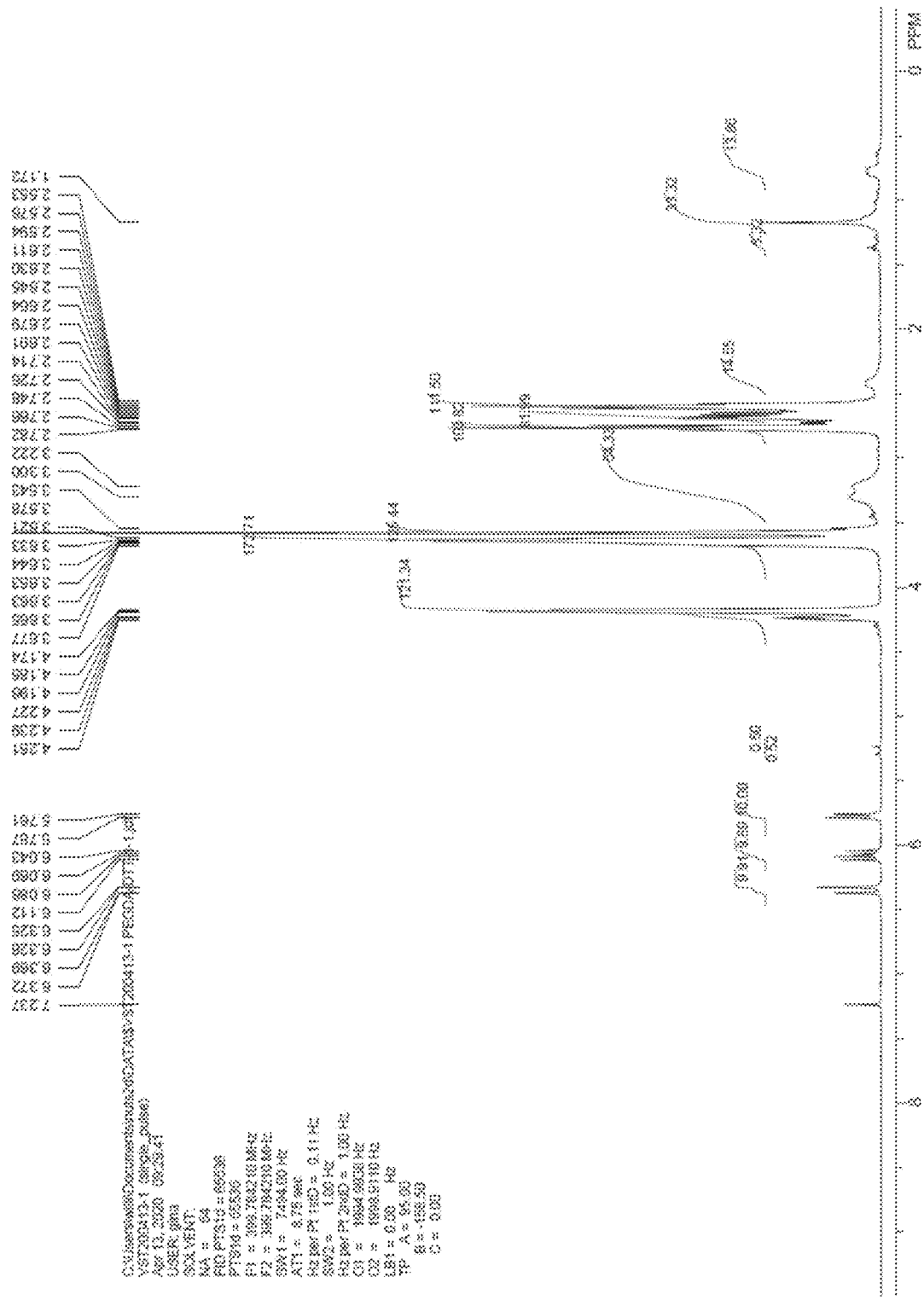
FIG. 16 is an NMR spectra of PEGDTT (61.6% PEGDA-38.4% PEGDTT). $^1$H-NMR (400 MHz, $CD_2Cl_2$, 25° C., TMS): 5.8 and 6.4 ppm (dd, —CH=C$\underline{H}_2$), 6.1 ppm (dd, —C$\underline{H}$=CH$_2$), 4.2 and 4.3 ppm (t, —C$\underline{H}_2$OCO—), 3.2 ppm (two overlapping s, —CHO$\underline{H}$), 2.8 ppm (t, —OCOC$\underline{H}_2$—), 2.7 ppm (dd, —SC$\underline{H}_2$COH—), 2.6 ppm (dd, —CH$_2$C$\underline{H}_2$S—).

As an example of a labile group that works with the precursor polymers and/or crosslinkers disclosed herein, it has been shown that reaction of D,L-dithiolthreitol (DTT) with PEGDA creates thio-(3-esters in the form of PEGDTT that speed up degradation of PEGDA without much alteration of its molecular weight or mechanical properties. In some embodiments, the structure may include the following:

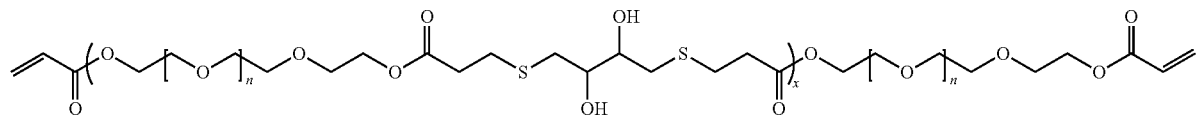

where x=2 and n is from about 1-100. (FIG. 16)

Figure 17:
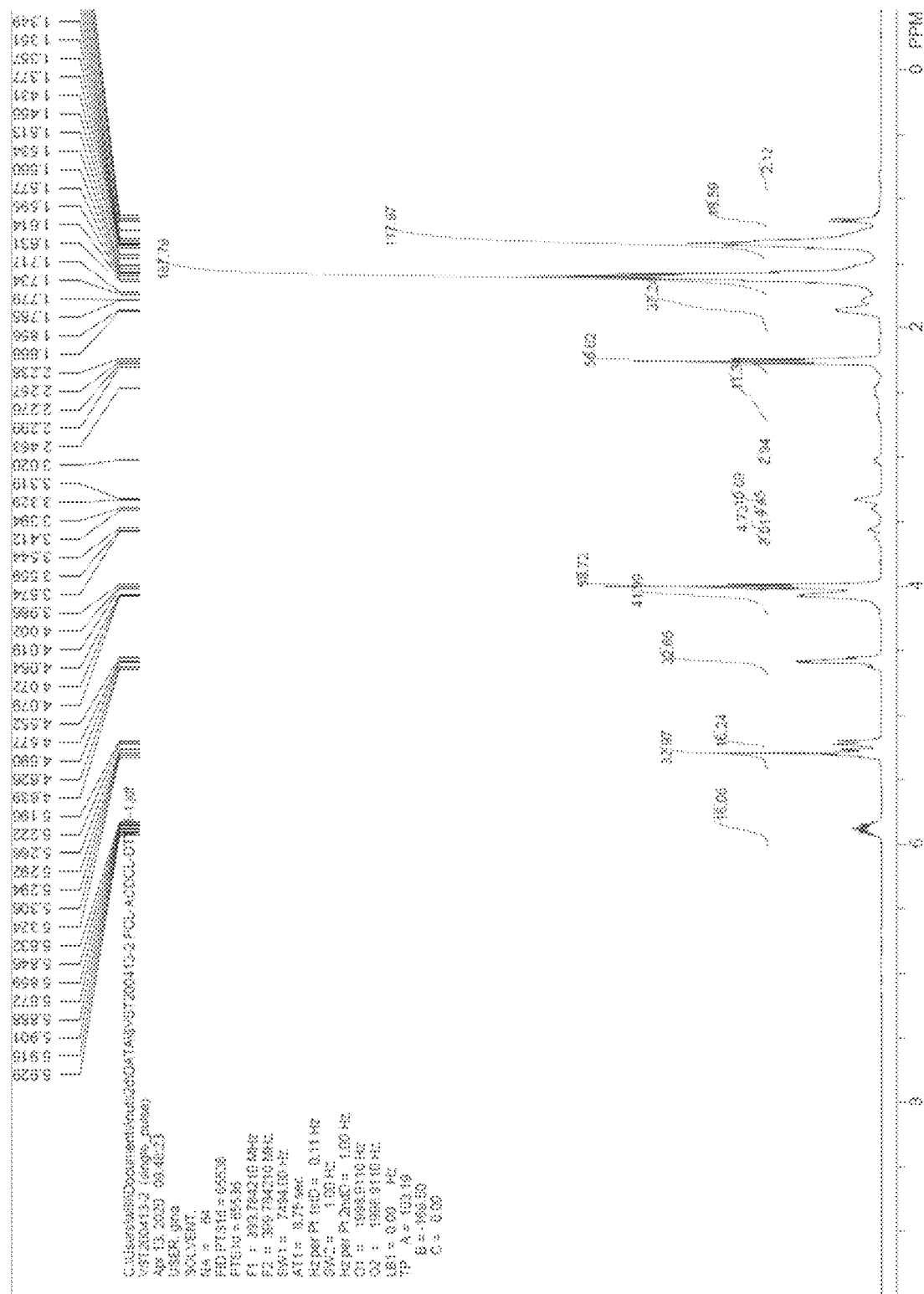
FIG. 17 is an NMR spectra of PCL-ACPCL-ACPCLDTT with low amounts (about 2.9%) of DTT functionalization. $^1$H-NMR (400 MHz, $CD_2Cl_2$, 25° C., TMS): 5.92 ppm (m, —C$\underline{H}$=CH$_2$), 5.31 ppm (m, —CH=C$\underline{H}_2$), 4.63 ppm (m, —C$\underline{H}$=CH$_2$O), 4.15 ppm (m; —OC$\underline{H}_2$), 3.7 ppm (m; —OCOCH$_2$CH$_2$S—), 3.35 (m; —C$\underline{H}$—CH$_2$), 3.2 ppm (two overlapping s, —CHO$\underline{H}$), 2.8 ppm (t, —OCOC$\underline{H}_2$—), 2.7 ppm (dd, —SC$\underline{H}_2$COH—), 2.6 ppm (dd, —CH$_2$C$\underline{H}_2$S—), 2.33 ppm (t, $^3$J(H,H)=7.5 Hz; —C$\underline{H}_2$), 1.96 ppm (m, —C$\underline{H}_2$), 1.62 (m; —C$\underline{H}_2$), 1.39 ppm (m; —C$\underline{H}_2$).
Figure 18:
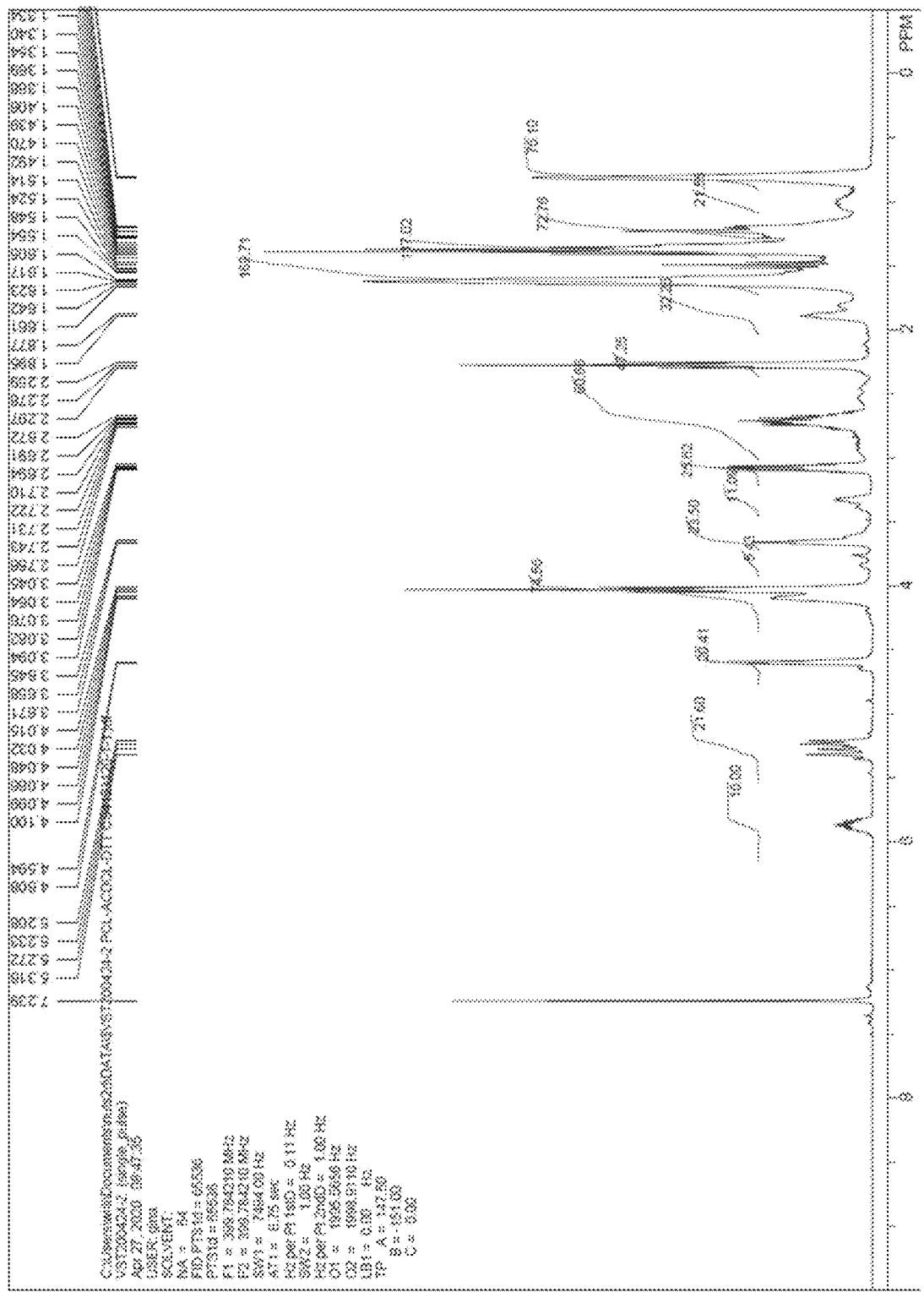
FIG. 18 is an NMR spectra of PCL-ACPCL-ACPCLDTT with high amounts (about 34.4%) of DTT functionalization. $^1$H-NMR (400 MHz, $CD_2Cl_2$, 25° C., TMS): 5.92 ppm (m, —C$\underline{H}$=CH$_2$), 5.31 ppm (m, —CH=C$\underline{H}_2$), 4.63 ppm (m, —C$\underline{H}$=CH$_2$O), 4.15 ppm (m; —OC$\underline{H}_2$), 3.7 ppm (m; —OCOCH$_2$CH$_2$S—), 3.35 (m; —C$\underline{H}$—CH$_2$), 3.2 ppm (two overlapping s, —CHO$\underline{H}$), 2.8 ppm (t, —OCOC$\underline{H}_2$—), 2.7 ppm (dd, —SC$\underline{H}_2$COH—), 2.6 ppm (dd, —CH$_2$C$\underline{H}_2$S—), 2.33 ppm (t, $^3$J(H,H)=7.5 Hz; —C$\underline{H}_2$), 1.96 ppm (m, —C$\underline{H}_2$), 1.62 (m; —C$\underline{H}_2$), 1.39 ppm (m; —C$\underline{H}_2$).
Figure 19:
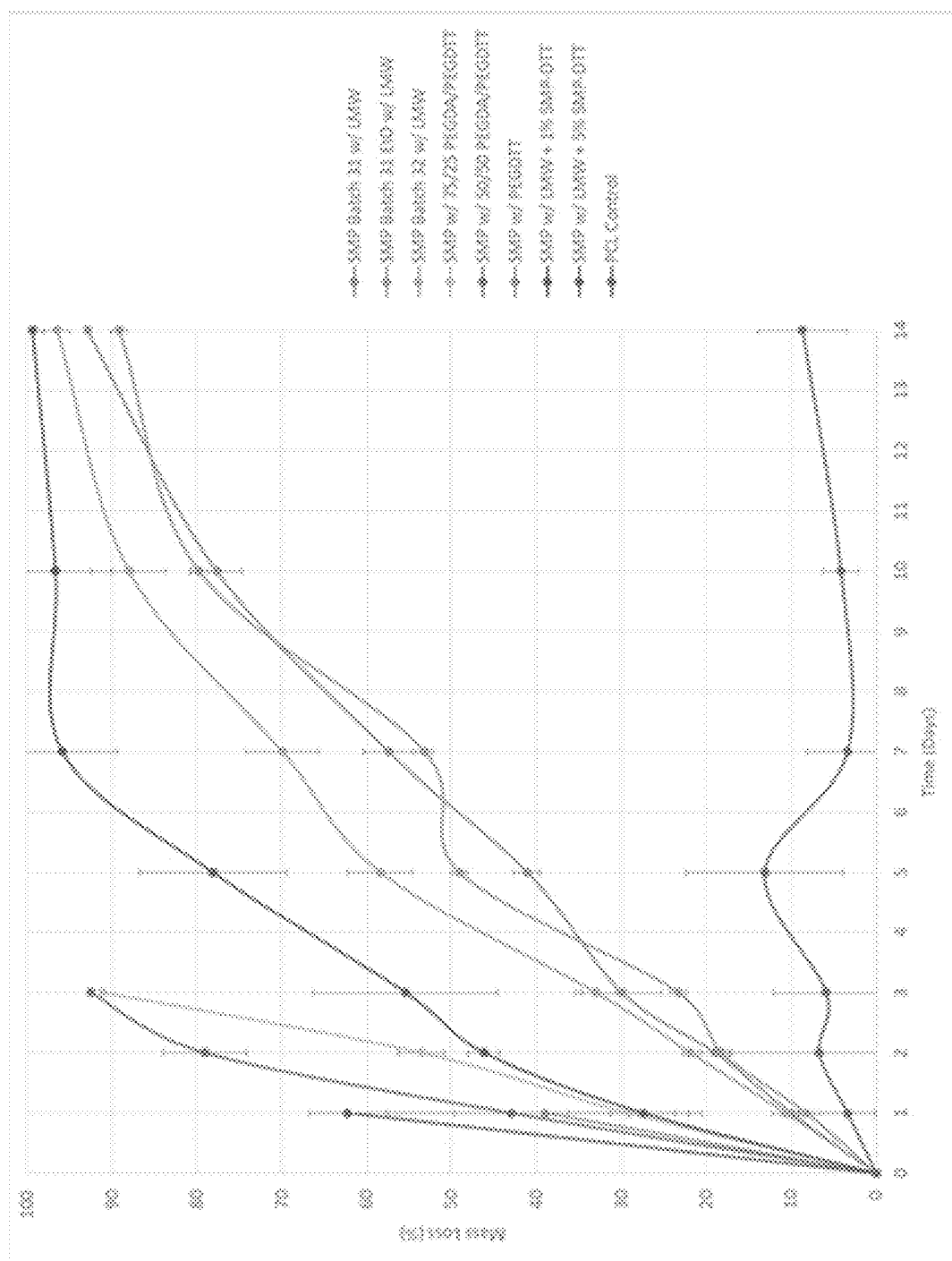
FIG. 19 is a plot of accelerated in vitro degradation data of various formulations.

Another embodiment may include the reaction of D,L-dithiolthreitol (DTT) with vinyl polymers, including but not limited to PCL-ACPCL to form PCL-ACPCL-ACPCLDTT. Both low (2.9%, FIG. 17) and high (34.4%, FIG. 18) amounts of DTT functionalization can be achieved by varying the amount of DTT and trimethylamine (TEA) in the Michael-type addition reaction. In some embodiments, the structure may include the following:

In some embodiments, vinyl-carboxy late functionalization of polyesters such as PCL speeds up degradation. Accelerated in vitro degradation results of various formulations in PBS with 0.5 M NaOH are shown in FIG. 19 and supports the notion that vinyl-carboxylate functionalization

Figure 20:
FIG. 20 is a graph of estimated in vivo degradation timelines based on accelerated in vitro degradation results of a known PCL degradation timeline of approximately 2-4 years in vivo.

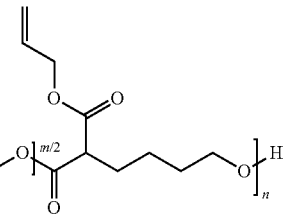

of polyesters such as PCL speeds up degradation, as does DTT functionalizations of vinyl- or acrylate-containing polymers: SMP samples (Batch 32) pre-treated in 5 M NaOH for 72 hours degraded slightly faster than Batch 32, but the crosslinked matrix was very brittle as a result, emphasizing the need to enhance degradation of vinyl-functionalized polymers and/or SMPs by another means. There was no detectable difference in degradation rates from ethylene oxide treated samples. As PCL has a known degradation timeline in vivo of 2-4 years, 10 kD crystalline, uncrosslinked PCL was used as a control, the degradation time of SMP or vinyl-functionalized formulations could be estimated. Based on these results, the SMP formulations with high amounts (>30%) of ACPCL functionalization degrade within 1-11 months (FIG. 20). Formulations with less ACPCL functionalization and/or other material property changes could degrade slower, more similar to PCL's 2-4 year degradation timeline, while those with higher amounts

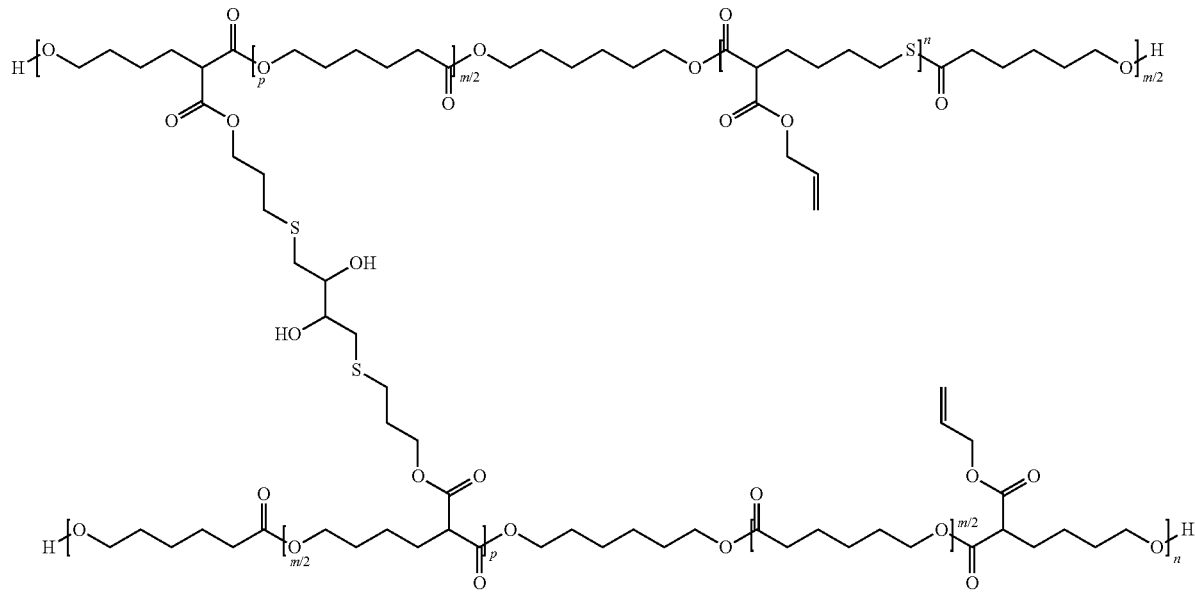

where m, n, and p are integers ranging from about 1-300.

of DTT-functionalized PCL-ACPCL and/or a combination of DTT-functionalized PCL-ACPCL and DTT-functionalized PEGDTT, could degrade in shorter times (e.g. approximately 2 weeks).

SMP Batch 31 w/ LMW=68.4% PCL-31.6% ACPCL w/ PEGDA

SMP Batch 31 w/ EtO w/ LMW=68.4% PCL-31.6% ACPCL w/ PEGDA, then 2× ethylene oxide sterilized SMP Batch 32 w/ LMW=64.1% PCL-35.9% ACPCL w/ PEGDA SMP w/ PEGDTT SMP w/ 75:25 PEGDA:PEGDTT SMP w/ 50:50 PEGDA:PEGDTT SMP w/ PEGDTT=no PEGDA SMP w/ LMW+1% SMP-DTT=SMP w/ PEGDA and 1 wt % of highly-functionalized (34.4%) PCL-ACPCL-ACPCLDTT SMP w/ LMW+5% SMP-DTT=SMP w/ PEGDA and 5 wt % of highly-functionalized (34.4%) PCL-ACPCL-ACPCLDTT PCL Control=10 kD, crystalline, uncrosslinked PCL

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Dissolving the SMP Material

| Equipment Needed | Materials Needed |
| --- | --- |
| Hot-stir plate | DMSO: Sigma-part# 317275-500ML |
| Weighing balance | VenoStent PCL (PCL-ACPCL) or SMP |
| Metal spatula | |
| Weighing paper | |
| 50 mL glass beaker | |
| Stir bar | |
| 50 mL conical tube | |

Protocol
1. Prepare water bath at 40-45° C.
2. Transfer appropriate amount of DMSO to small beaker or container
3. Transfer beaker to water bath
4. Cover beaker or container with aluminum foil or cap to prevent DMSO evaporation
5. Allow 5 min for DMSO to warm up
6. Carefully transfer appropriate amount of SMP powder to warm DMSO
7. Cover beaker with aluminum foil and initiate moderate-high stirring
8. SMP material typically dissolves within 10-20 minutes
9. Transfer to 50 mL conical tube
10. Typically, prepare 10 mL of 70 wt % solution
11. 6 g SMP in 10 mL DMSO
12. Dark cherry color formation at this concentration
NOTE: The SMP solution will solidify when left out at room temperature for prolonged amount of time. Simply place in water bath or in oven (40-60° C.) to liquify the SMP material.

Preparing Printing Solution

| Equipment Needed | Materials Needed |
| --- | --- |
| 40-60° C. oven or water bath | 70 wt % PCL |
| Metal spatula | DTPO: Sigma-part# 415952-10G |
| Weighing paper | DMSO: Sigma-part# 317275-500ML |
| Vortexor | |
| 15 mL conical tube | |
| Positive displacement pipettor | |

Protocol
1. Obtain 70 wt % SMP solution
  Suggest using positive displacement pipettors/tips when working with viscous solutions
2. Add 1 wt % DTPO to conical tube
  For 2 mL of total solution, add 0.02 g DTPO into conical tube
3. Ensure DTPO is fully submerged in SMP solution
4. Vortex
5. Place in oven or water bath and vortex as needed.

Printing with SMP Material

Protocol
1. Pre-heat printer to 40-45° C.
  May need to optimize temperature to ensure SMP solution stays completely liquid
  The SMP solution will become more viscous, solidify, and/or appear cloudy at non-ideal temperatures
2. After verifying that the SMP+DTPO solution is homogenous, transfer printing solution into printer reservoir
3. Lower Z-platform
4. Initiate printing
5. Suggested start print settings:
6. Using our 405 nm DLP system, we print at 35 mW/cm$^2$ (measured w/ 405 nm probe—G&R Labs Model 222) at 50 μm layer thickness of regular exposure time of 6.5 s with 20 s exposure of the first 3 layers.

Post-Processing of PCL Prints

| Equipment Needed | Materials Needed |
| --- | --- |
| 40-60° C. oven or water bath | DMSO: Sigma-part# 317275-500ML |
| Razor blade | Ethanol (190 or 200 proof) |
| 50 mL conical tube | Isopropyl Alcohol (91%) |
| | Kimwipe |

Protocol
1. First, warm DMSO in conical tube to 40-60° C.
  Warming up the DMSO is crucial to ensure that unreacted print solution leaches from the printed material
2. After print is completed, remove from print platform with razor and transfer to warmed DMSO
3. Incubate at 40-60° C. for 30 minutes, then subsequent washes for approximately 20 minutes
  The DMSO solution will become slightly brown/orange due to the unreacted PCL leaching out of the printed part
  The printed object will swell slightly and appear transparent in warm DMSO
4. After incubation in DMSO, transfer the printed object into a container with ethanol at 40° C. to 60° C. for 20 minutes, then overnight in ethanol with a fresh container
  In ethanol, the printed material will shrink slightly and become opaque
  The Z-platform and reservoir can be wiped with a kimwipe, then cleaned with isopropyl alcohol or acetone 5. Remove platform as needed, and wash another 20 minutes in ethanol.
6. Dry the print under ambient conditions and/or under vacuum.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The invention claimed is:

1. An article comprising a photopolymerization product of a precursor polymer, an alkylene oxide crosslinker, and a photoinitiator, the precursor polymer includes a first repeat unit and a second repeat unit, wherein one or both of the first repeat unit and second repeat unit comprises polyester repeat units, the alkylene oxide crosslinker comprises polyethylene glycol with acrylate end caps, the first repeat unit includes at least one vinyl-terminated side-chain; and wherein the Young's Modulus of the article is about 1.5 MPa or less at 37° C.

2. The article according to claim 1, wherein the precursor polymer has the following structure:

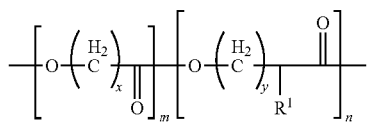

wherein, independently for each occurrence, m and n are integers from 5-400, having an m:n ratio from 1:1 to 20:1, wherein x and y are each independently an integer from 1-10; and $R^1$ includes a vinyl terminated side-chain.

3. The article according to claim 2, wherein R1 has the following structure:

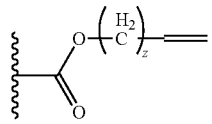

wherein z is an integer from 1-10.

4. The article according to claim 1, wherein the alkylene oxide crosslinker has the following structure:

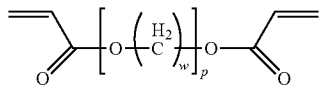

wherein w is an integer from 2-4, and p is an integer from 1-20.

5. The article according to claim 1, wherein the precursor polymer comprises at least one labile bond.

6. The article according to claim 5, wherein the labile bond is formed from the reaction of the precursor polymer with D,L-dithiolthreitol.

7. The article according to claim 1, wherein a labile bond is formed from the reaction of the acrylate crosslinker with D,L-dithiolthreitol.

8. The article according to claim 6, wherein the article having the labile bond is configured to degrade at a faster rate compared to the article without the labile bond.

9. The article according to claim 1, wherein a percent functionalization of the photopolymerization product is greater than 35%.

10. The article according to claim 9, wherein a percent functionalization of the photopolymerization product is greater from 35%-45%.

11. An article comprising a photopolymerization product of a precursor polymer and a photoinitiator, the precursor polymer having the following structure:

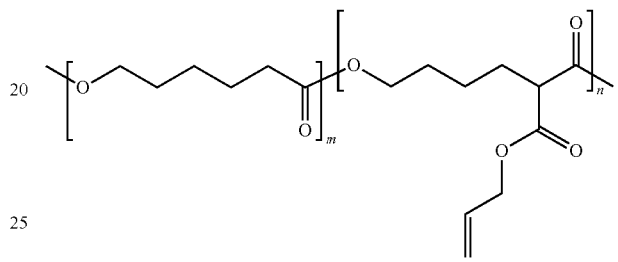

wherein, independently for each occurrence, m and n are integers from 5-400, and wherein the m:n ratio is from 1:1 to 20:1;

wherein the photopolymerization product further comprises an alkylene oxide crosslinker having the following structure:

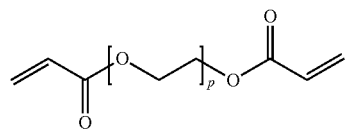

wherein p is an integer from 1-20; and
wherein the Young's Modulus of the article is about 1.5 MPa or less at 37° C.

12. The article according to claim 11, wherein the precursor polymer comprises at least one labile bond.

13. The article according to claim 12, wherein the labile bond is formed from the reaction of the precursor polymer with D,L-dithiolthreitol.

14. The article according to claim 11, wherein a labile bond is formed from the reaction of the alkylene oxide crosslinker with D,L-dithiolthreitol, and wherein the alkylene oxide crosslinker reacted with D,L-dithiolthreitol has a molecular weight between 200 and 6000 daltons.

15. The article according to claim 14, wherein the article having the labile bond is configured to degrade at a faster rate compared to the article without the labile bond.

16. The article according to claim 11, wherein a percent functionalization of the photopolymerization product is greater than 35%.

17. The article according to claim 16, wherein a percent functionalization of the photopolymerization product is greater from 35%-45%.

* * * * *